US012809905B2

(12) United States Patent
Milburn

(10) Patent No.: US 12,809,905 B2
(45) Date of Patent: Nov. 24, 2026

(54) SYSTEMS AND METHODS FOR METADATA UPDATE

(71) Applicant: DOVER MICROSYSTEMS, INC., Waltham, MA (US)

(72) Inventor: Steven Milburn, Waltham, MA (US)

(73) Assignee: Dover Microsystems, Inc., Wayland, MA (US)

( * ) Notice: Subject to any disclaimer, the term of this patent is extended or adjusted under 35 U.S.C. 154(b) by 32 days.

(21) Appl. No.: 18/926,405

(22) Filed: Oct. 25, 2024

(65) Prior Publication Data

US 2025/0138824 A1 May 1, 2025

Related U.S. Application Data

(60) Provisional application No. 63/593,056, filed on Oct. 25, 2023.

(51) Int. Cl.

| | |
|---|---|
| ***G06F 16/30*** | (2019.01) |
| ***G06F 9/30*** | (2018.01) |
| ***G06F 16/38*** | (2019.01) |
| *G06F 8/41* | (2018.01) |
| *G06F 16/2457* | (2019.01) |
| *G06F 16/903* | (2019.01) |
| *G06F 18/2413* | (2023.01) |

(52) U.S. Cl.
CPC .......... *G06F 16/38* (2019.01); *G06F 9/30038* (2023.08); *G06F 8/441* (2013.01); *G06F 16/24573* (2019.01); *G06F 16/90344* (2019.01); *G06F 18/2413* (2023.01)

(58) Field of Classification Search
CPC ............... G06F 16/24573; G06F 16/38; G06F 16/90344; G06F 8/441; G06F 9/30038; G06F 18/2413
See application file for complete search history.

(56) References Cited

U.S. PATENT DOCUMENTS

2017/0177368 A1* 6/2017 DeHon ............... G06F 12/1408
2021/0042100 A1* 2/2021 Boling ..................... G06F 8/44
2022/0092173 A1* 3/2022 Sutherland ............ G06F 21/125

FOREIGN PATENT DOCUMENTS

WO WO-2021178493 A1 * 9/2021 ............. G06F 21/79

* cited by examiner

*Primary Examiner* — Diedra McQuitery
(74) *Attorney, Agent, or Firm* — Hsuanyeh Law Group PC

(57) ABSTRACT

Systems and methods for updating metadata. In some embodiments, processing hardware may receive an input metadata pattern associated with an instruction executed by a host processor. The input metadata pattern may comprise: one or more first input metadata labels associated with the instruction and/or a state of the host processor; and one or more second input metadata labels associated, respectively, with one or more registers used by the instruction and/or one or more memory locations referenced by the instruction. The processing hardware may generate an output metadata pattern, wherein: the one or more first input metadata labels are used to determine how to process the one or more second input metadata labels to generate the output metadata pattern.

31 Claims, 17 Drawing Sheets

SYSTEMS AND METHODS FOR METADATA UPDATE

RELATED APPLICATION

This application claims priority under 35 U.S.C. § 119 (e) to U.S. provisional patent application, U.S. Ser. No. 63/593,056, filed Oct. 25, 2023 which is herein incorporated by reference in its entirety.

BACKGROUND

Computer security has become an increasingly urgent concern at all levels of society, from individuals to businesses to government institutions. Security professionals are constantly playing catch-up with attackers. As soon as a vulnerability is reported, security professionals rush to patch the vulnerability. Individuals and organizations that fail to patch vulnerabilities in a timely manner (e.g., due to poor governance and/or lack of resources) become easy targets for attackers.

Some security software monitors activities on a computer and/or within a network, and looks for patterns that may be indicative of an attack. Such an approach does not prevent malicious code from being executed in the first place. Often, the damage has been done by the time any suspicious pattern emerges.

SUMMARY

In accordance with some embodiments, a method is provided for updating metadata. The method is performed by processing hardware, and comprises acts of: receiving an input metadata pattern associated with an instruction executed by a host processor, the input metadata pattern comprising: one or more first input metadata labels associated with the instruction and/or a state of the host processor; and one or more second input metadata labels associated, respectively, with one or more registers used by the instruction and/or one or more memory locations referenced by the instruction; and generating an output metadata pattern, wherein: the one or more first input metadata labels are used to determine how to process the one or more second input metadata labels to generate the output metadata pattern.

In accordance with some embodiments, a system is provided, comprising processing hardware configured to perform any of the methods described herein. The processing hardware may include one or more processors programmed by executable instructions to perform any of the methods described herein, one or more programmable logic devices programmed by bitstreams to perform any of the methods described herein, and/or one or more logic circuits fabricated into semiconductors to perform any of the methods described herein.

In accordance with some embodiments, the processing hardware is configured to use the one or more first metadata labels to look up a transformation to be applied to a bit string obtained from the one or more second input metadata labels. The transformation may comprise a mask.

In accordance with some embodiments, the one or more first input metadata labels are associated, respectively, with one or more first input slots; and the one or more second input metadata labels are associated, respectively, with one or more second input slots.

In accordance with some embodiments, the processing hardware is configured to use the one or more first metadata labels to selectively disable at least one second input slot of the one or more second input slots.

In accordance with some embodiments, the processing hardware is configured to use the one or more first metadata labels to selectively activate at least one hardware block of a plurality of hardware blocks configured to process information obtained from the one or more second input metadata labels.

In accordance with some embodiments, the processing hardware is configured to use the one or more first metadata labels to configure a hardware block for processing information obtained from the one or more second input metadata labels. The hardware block may be configured to apply a selected operation to one or more bit strings obtained from the one or more second input metadata labels; and the operation may be selected, based on the one or more first metadata labels, from a plurality of operations on bit strings. In some embodiments, the hardware block is configured to generate, based on the information obtained from the one or more second input metadata labels, at least one output metadata label; and the processing hardware is further configured to use the one or more first metadata labels to select at least one output slot from a plurality of output slots; and provide the at least one output metadata label to the at least one selected output slot.

In accordance with some embodiments, the processing hardware comprises a policy check function block configured to provide, based on the one or more first input metadata labels and/or the one or more second input metadata labels, an indication of whether the instruction is allowed according to one or more policies.

In accordance with some embodiments, the processing hardware further comprises a conversion block configured to convert the one or more first input metadata labels and/or the one or more second input metadata labels into one or more third input metadata labels; and the policy check function block is configured to receive, as input, the one or more third input metadata labels. The conversion block may comprise an expansion block configured to convert bit strings of length N' into bit strings of length N, where N>N'. The processing hardware may further comprise an output function block configured to provide, based on the one or more first input metadata labels and/or the one or more second input metadata labels, one or more output metadata labels to one or more respective output slots.

In accordance with some embodiments, the processing hardware comprises one or more programmable logic devices programmed by bitstreams. In accordance with some embodiments, the processing hardware comprises one or more logic circuits fabricated into semiconductors.

In accordance with some embodiments, at least one computer-readable medium is provided, having stored thereon any of the bitstreams described herein.

In accordance with some embodiments, at least one computer-readable medium is provided, having stored thereon at least one netlist for any of the bitstreams and/or fabricated logic described herein.

In accordance with some embodiments, at least one computer-readable medium is provided, having stored thereon at least one hardware description that, when synthesized, produces any of the netlists described herein.

In accordance with some embodiments, at least one computer-readable medium is provided, having stored thereon any of the executable instructions described herein.

DETAILED DESCRIPTION

This application may include subject matter related to that of International Patent Application No. PCT/US2020/013678, filed on Jan. 15, 2020, titled "SYSTEMS AND METHODS FOR MATADATA CLASSIFICATION,", which is hereby incorporated by reference in its entirety.

This application may include subject matter related to that of International Application No. PCT/US2020/055952, filed on Oct. 16, 2020, entitled "SYSTEMS AND METHODS FOR UPDATING METADATA," which is hereby incorporated by reference in its entirety.

This application may include subject matter related to that of International Application No. PCT/US2023/020132, filed on Apr. 27, 2023, entitled "SYSTEMS AND METHODS FOR ENFORCING ENCODED POLICIES," which is hereby incorporated by reference in its entirety.

Many security vulnerabilities trace back to a computer architectural design where data and executable instructions are intermingled in the same memory. This intermingling allows an attacker to inject malicious code into a remote computer by disguising the malicious code as data. For instance, a program may allocate a buffer in a computer's memory to store data received via a network. If the program receives more data than the buffer can hold, but does not check the size of the received data prior to writing the data into the buffer, part of the received data would be written beyond the buffer's boundary, into adjacent memory. An attacker may exploit this behavior to inject malicious code into the adjacent memory. If the adjacent memory is allocated for executable code, the malicious code may eventually be executed by the computer.

Techniques have been proposed to make computer hardware more security aware. For instance, memory locations may be associated with metadata for use in enforcing security policies, and instructions may be checked for compliance with the security policies. For example, given an instruction executed by a processor, metadata associated with the instruction and/or metadata associated with one or more operands of the instruction may be checked to determine if the instruction is allowed. Such checking may be performed before or after the processor has finished executing the instruction. Additionally, or alternatively, appropriate metadata may be associated with an output of the instruction.

It should be appreciated that security policies are discussed above solely for purposes of illustration, as aspects of the present disclosure are not limited to enforcing any particular type of policy, or any policy at all. In some embodiments, one or more of the techniques described herein may be used to enforce one or more other types of policies (e.g., safety policies, privacy policies, etc.), in addition to, or instead of, security policies.

Figure 1:
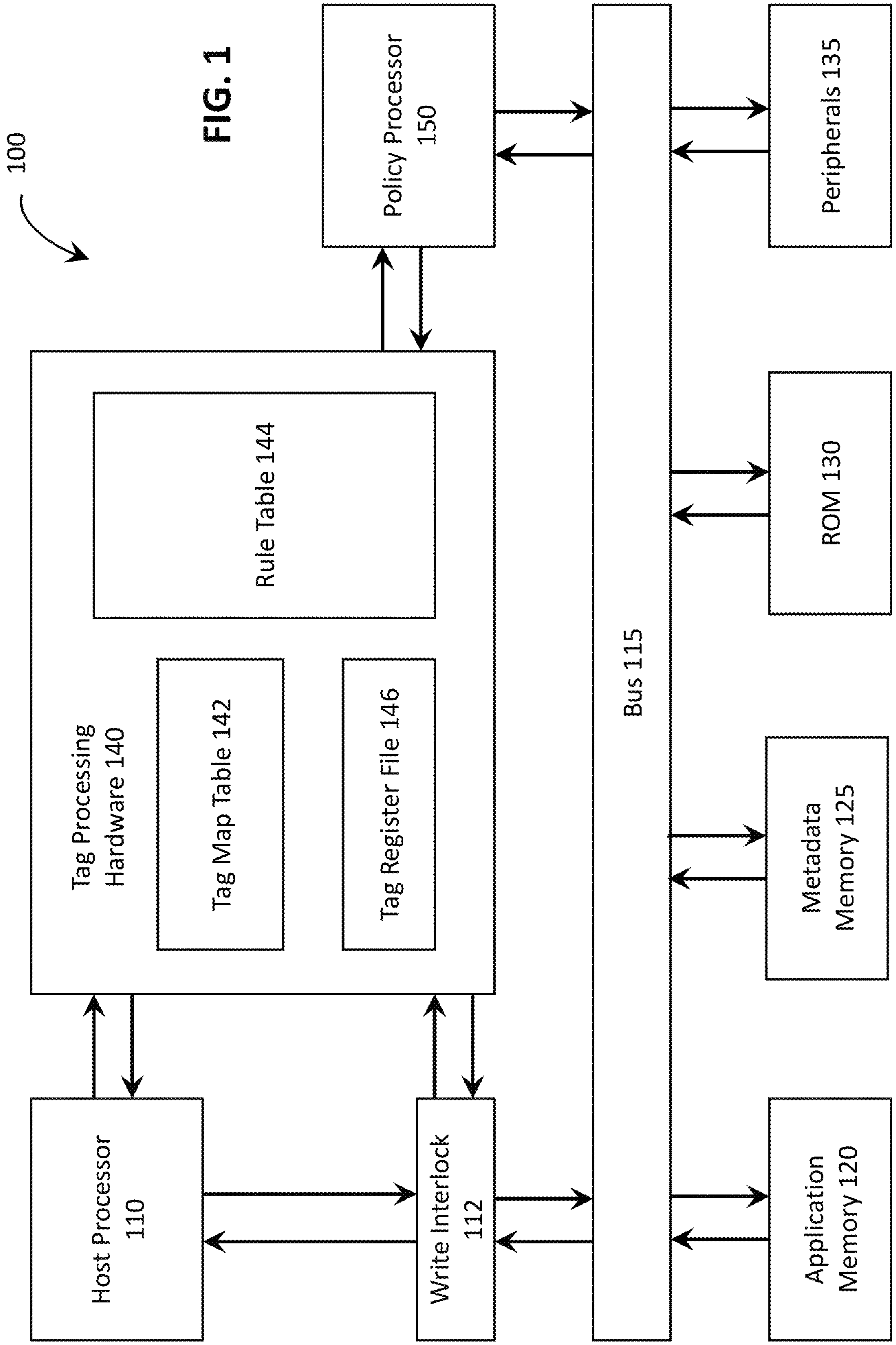
FIG. 1 shows an illustrative hardware system 100 for enforcing policies, in accordance with some embodiments.

FIG. 1 shows an illustrative hardware system 100 for enforcing policies, in accordance with some embodiments. In this example, the system 100 includes a host processor 110, which may have any suitable instruction set architecture (ISA) such as a reduced instruction set computing (RISC) architecture or a complex instruction set computing (CISC) architecture. The host processor 110 may perform memory accesses via a write interlock 112. The write interlock 112 may be connected to a system bus 115 configured to transfer data between various components such as the write interlock 112, an application memory 120, a metadata memory 125, a read-only memory (ROM) 130, one or more peripherals 135, etc.

In some embodiments, data that is manipulated (e.g., modified, consumed, and/or produced) by the host processor 110 may be stored in the application memory 120. Such data may be referred to herein as "application data," as distinguished from metadata used for enforcing policies. The latter may be stored in the metadata memory 125. It should be appreciated that application data may include data manipulated by an operating system (OS), instructions of the OS, data manipulated by one or more user applications, and/or instructions of the one or more user applications.

In some embodiments, the application memory 120 and the metadata memory 125 may be physically separate, and the host processor 110 may have no access to the metadata memory 125. In this manner, even if an attacker succeeds in injecting malicious code into the application memory 120 and causing the host processor 110 to execute the malicious code, the metadata memory 125 may not be affected. However, it should be appreciated that aspects of the present disclosure are not limited to storing application data and metadata on physically separate memories.

Additionally, or alternatively, metadata may be stored in the same memory as application data, and a memory management component may be used to implement an appropriate protection scheme to prevent instructions executing on the host processor 110 from modifying the metadata. Additionally, or alternatively, metadata may be intermingled with application data in the same memory, and one or more policies may be used to protect the metadata.

In some embodiments, tag processing hardware 140 may be provided to ensure that instructions executed by the host processor 110 comply with one or more policies. The tag processing hardware 140 may operate at hardware speed. For instance, the tag processing hardware 140 may be implemented using one or more programmable logic devices, such as field-programmable gate arrays (FPGAs) programed by bitstreams, and/or one or more logic circuits fabricated into semiconductors, and therefore may be capable of checking instructions at a speed that is comparable to a speed at which the instructions are executed by the host processor 110. Such checking may be performed for an instruction before or after the host processor 110 finishes executing the instruction.

In some embodiments, the tag processing hardware 140 may, on average, check one instruction for every N instructions executed by the host processor 110, where N may be 1, 2, 3, 4, 5, . . . , 10, . . . . The number N may be chosen based on a proportion of instructions to be checked. As an example, if every instruction is to be checked, then N may be 1.

Additionally, or alternatively, an upperbound may be provided for a measure of divergence. As an example, the tag processing hardware 140 may include a queue for storing instructions to be checked. Such a queue may, at any given time, store at most M instructions, where M may be 10, . . . 50, . . . , 100, . . . , 500, . . . . Thus, the tag processing hardware 140 may be at most M instructions behind the host processor 110 at any given time.

The tag processing hardware 140 may include any suitable component or combination of components. For instance, the tag processing hardware 140 may include a tag map table 142 that maps addresses in the application memory 120 to addresses in the metadata memory 125. For example, the tag map table 142 may map an address X in the application memory 120 to an address Y in the metadata memory 125. A value stored at the address Y may be referred to herein as a "metadata tag."

In some embodiments, a value stored at the address Y may in turn be an address Z. Such indirection may be repeated one or more times, and may eventually lead to a data structure in the metadata memory 125 for storing metadata. Such metadata, as well as any intermediate address (e.g., the address Z), may also be referred to herein as "metadata tags."

It should be appreciated that aspects of the present disclosure are not limited to a tag map table that stores addresses in a metadata memory. In some embodiments, a tag map table entry itself may store metadata, so that the tag processing hardware 140 may be able to access the metadata without performing a memory operation.

In some embodiments, a tag map table entry may store a selected bit pattern, where a first portion of the bit pattern may encode metadata, and a second portion of the bit pattern may encode an address in a metadata memory where further metadata may be stored. This may provide a desired balance between speed and expressivity. For instance, the tag processing hardware 140 may be able to check certain policies quickly, using only the metadata stored in the tag map table entry itself. For other policies with more complex rules, the tag processing hardware 140 may access the further metadata stored in the metadata memory 125.

Referring again to the example of FIG. 1, by mapping application memory addresses to metadata memory addresses, the tag map table 142 may create an association between application data and metadata. In one example, metadata stored at the metadata memory address Y and thus associated with application data stored at the application memory address X may indicate that the application data may be readable, writable, and/or executable. In another example, metadata stored at the metadata memory address Y and thus associated with application data stored at the application memory address X may indicate a type of the application data (e.g., integer, pointer, 16-bit word, 32-bit word, etc.). Depending on a policy to be enforced, any suitable metadata relevant for the policy may be associated with application data.

In some embodiments, a metadata memory address Z may be stored at the metadata memory address Y. Metadata to be associated with the application data stored at the application memory address X may be stored at the metadata memory address Z, instead of (or in addition to) the metadata memory address Y. For instance, a binary representation of a metadata label {RED} may be stored at the metadata memory address Z. By storing the metadata memory address Z in the metadata memory address Y, the application data stored at the application memory address X may be tagged with the metadata label {RED}.

In this manner, the binary representation of the metadata label {RED} may be stored only once in the metadata memory 125. For instance, if application data stored at another application memory address X' is also to be tagged with {RED}, the tag map table 142 may map the application memory address X' to a metadata memory address Y' where the metadata memory address Z is also stored.

Moreover, in this manner, tag update may be simplified. For instance, if the application data stored at the application memory address X is to be tagged with a metadata label {BLUE} at a subsequent time, a metadata memory address Z' may be written at the metadata memory address Y, to replace the metadata memory address Z, and a binary representation of the metadata label {BLUE} may be stored at the metadata memory address Z'.

Thus, the inventor has recognized and appreciated that a chain of metadata memory addresses of any suitable length N may be used for tagging, including N=0 (e.g., where a binary representation of a metadata label is stored at the metadata memory address Y itself).

The association between application data and metadata (also referred to herein as "tagging") may be done at any suitable level of granularity, and/or variable granularity. For instance, tagging may be done on a word-by-word basis. Additionally, or alternatively, a region in memory may be mapped to a single metadata tag, so that all words in that region are associated with the same metadata. This may advantageously reduce a size of the tag map table 142 and/or the metadata memory 125. For example, a single metadata tag may be maintained for an entire address range, as opposed to maintaining multiple metadata tags corresponding, respectively, to different addresses in the address range.

In some embodiments, the tag processing hardware 140 may be configured to apply one or more rules to metadata associated with an instruction and/or metadata associated with one or more operands of the instruction to determine if the instruction is allowed. For instance, the host processor 110 may fetch and execute an instruction (e.g., a store instruction), and may queue a result of executing the instruction (e.g., a value to be stored) into the write interlock 112. Before the result is written into the application memory 120, the host processor 110 may send, to the tag processing hardware 140, an instruction type (e.g., opcode), a memory address from which the instruction is fetched, one or more memory addresses referenced by the instruction, and/or one or more register identifiers. Such a register identifier may identify a register used by the host processor 110 in executing the instruction, such as a register for storing an operand or a result of the instruction.

In some embodiments, destructive load instructions may be queued in addition to, or instead of, store instructions. For instance, subsequent instructions attempting to access a target address of a destructive load instruction may be queued in a designated memory region. If and when it is determined that the destructive load instruction is allowed, the queued instructions may be loaded for execution.

In some embodiments, a destructive load instruction may be executed, and data read from a target address may be captured in a buffer. If and when it is determined that the destructive load instruction is allowed, the data captured in the buffer may be discarded. If and when it is determined that the destructive load instruction is not allowed, the data captured in the buffer may be restored to the target address. Additionally, or alternatively, a subsequent read may be serviced by the buffered data.

It should be appreciated that aspects of the present disclosure are not limited to performing metadata processing on instructions that a host processor has finished executing (e.g., instructions that have been retired by the host processor's execution pipeline). In some embodiments, metadata processing may be performed on instructions before, during, and/or after the host processor's execution pipeline. Thus, an instruction executed by the host processor may be an instruction that is queued for execution, being executed within a pipeline, or retired.

In some embodiments, given an address received from the host processor 110 (e.g., an address from which an instruction is fetched, or an address referenced by an instruction), the tag processing hardware 140 may use the tag map table 142 to identify a corresponding metadata tag. Additionally, or alternatively, for a register identifier received from the host processor 110, the tag processing hardware 140 may access a metadata tag from a tag register file 146.

In some embodiments, if an application memory address does not have a corresponding entry in the tag map table 142, the tag processing hardware 140 may send a query to a policy processor 150. The query may include the application memory address, and the policy processor 150 may return a metadata tag for that application memory address. Additionally, or alternatively, the policy processor 150 may create a new tag map table entry for an address range including the application memory address. In this manner, the appropriate metadata tag may be made available, for future reference, in the tag map table 142 in association with the application memory address.

In some embodiments, the tag processing hardware 140 may send a query to the policy processor 150 to check if an instruction executed by the host processor 110 is allowed. The query may include one or more inputs, such as an instruction type (e.g., opcode) of the instruction, a metadata tag for a program counter, a metadata tag for an application memory address from which the instruction is fetched (e.g., a word in memory to which the program counter points), a metadata tag for a register in which an operand of the instruction is stored, and/or a metadata tag for an application memory address referenced by the instruction.

In one example, the instruction may be a load instruction, and an operand of the instruction may be an application memory address from which application data is to be loaded. The query to the policy processor 150 may include, among other things, a metadata tag for a register in which the address is stored, as well as a metadata tag for an application memory location referenced by the address.

In another example, the instruction may be an arithmetic instruction, and there may be one or more operands stored in one or more respective registers. The query to the policy processor 150 may include, among other things, a metadata tag for each of the one or more registers.

It should be appreciated that aspects of the present disclosure are not limited to performing metadata processing on a single instruction at a time. In some embodiments, multiple instructions in an ISA of the host processor 110 may be checked together as a bundle, for example, via a single query to the policy processor 150. Such a query may include sufficient information to allow the policy processor 150 to check all of the instructions in the bundle.

Similarly, a CISC instruction, which may include, semantically, multiple operations, may be checked via a single query to the policy processor 150. Such a query may include sufficient information to allow the policy processor 150 to check all of the constituent operations within the CISC instruction.

In some embodiments, the tag processing hardware 140 may transform one or more opcodes of an ISA used by the host processor 110 into one or more opcodes in an ISA designed for metadata processing. For instance, the tag processing hardware 140 may transform multiple opcodes in the ISA used by the host processor 110 (e.g., add, subtract, multiply, divide, square root, AND, OR, NOT, etc.) into a common opcode in the ISA designed for metadata processing (e.g., math). This common opcode may be used to query the policy processor 150, in addition to, or instead of, an opcode in the ISA used by the host processor 110.

The inventor has recognized and appreciated that, by having an ISA designated for metadata processing, a number of different input patterns to be handled by the tag processing hardware 140 may advantageously be reduced. Furthermore, a policy written against the ISA designated for metadata processing may be portable across ISAs of different host processors (e.g., by configuring the tag processing hardware 140 to provide a suitable transformation from such an ISA to the ISA designated for metadata processing). However, it should be appreciated that aspects of the present disclosure are not limited to having an ISA designated for metadata processing.

In some embodiments, the policy processor 150 may have loaded therein one or more policies. In response to a query from the tag processing hardware 140, the policy processor 150 may evaluate one or more of the policies to determine if an instruction giving rise to the query is allowed. For instance, the tag processing hardware 140 may send an interrupt signal to the policy processor 150, along with one or more inputs relating to the instruction (e.g., as described above). The policy processor 150 may store the inputs of the query in a working memory (e.g., in one or more queues) for immediate or deferred processing. For example, the policy processor 150 may prioritize processing of queries in some suitable manner (e.g., based on a priority flag associated with each query).

In some embodiments, the policy processor 150 may evaluate one or more policies on one or more inputs (e.g., one or more input metadata tags) to determine if an instruction is allowed. If the instruction is not allowed, the policy processor 150 may so notify the tag processing hardware 140. If the instruction is allowed, the policy processor 150 may compute one or more outputs (e.g., one or more output metadata tags) to be returned to the tag processing hardware 140.

As one example, the instruction may be a store instruction, and the policy processor 150 may compute an output metadata tag for an application memory address to which application data is to be stored. As another example, the instruction may be an arithmetic instruction, and the policy processor 150 may compute an output metadata tag for a register storing a result of executing the arithmetic instruction.

In some embodiments, the policy processor 150 may be programmed to perform one or more tasks in addition to, or instead of, those relating to evaluation of policies. For instance, the policy processor 150 may perform tasks relating to tag initialization, boot loading, application loading, memory management (e.g., garbage collection) for the metadata memory 125, logging, debugging support, and/or interrupt processing. One or more of these tasks may be performed in the background (e.g., between servicing queries from the tag processing hardware 140).

In some embodiments, the policy processor 150 may operate at software speed. For instance, the policy processor 150 may include a processor programmed by executable instructions to implement one or more of the functionalities described above. Thus, it may take hundreds, or even thousands, of processor cycles to check one instruction executed by the host processor 110.

In some embodiments, the tag processing hardware 140 may include a rule table 144 for mapping one or more inputs to a decision and/or one or more outputs. For instance, a query into the rule table 144 may be similarly constructed as a query to the policy processor 150 to check if an instruction executed by the host processor 110 is allowed. If there is a match, the rule table 144 may output a decision as to whether the instruction is allowed, and/or one or more output metadata tags (e.g., as described above in connection with the policy processor 150). Such a mapping in the rule table 144 may be created using a query response from the policy processor 150. However, that is not required. In some embodiments, one or more mappings may be installed into the rule table 144 ahead of time.

In some embodiments, the rule table 144 may be used to provide a performance enhancement. For instance, before querying the policy processor 150 with one or more input metadata tags, the tag processing hardware 140 may first query the rule table 144 with the one or more input metadata tags. In case of a match, the tag processing hardware 140 may proceed with a decision and/or one or more output metadata tags from the rule table 144, without querying the policy processor 150. This may provide a significant speedup.

If, on the other hand, there is no match in the rule table 144, the tag processing hardware 140 may query the policy processor 150, and may install a response from the policy processor 150 into the rule table 144 for potential future use. Thus, the rule table 144 may function as a cache. However, it should be appreciated that aspects of the present disclosure are not limited to implementing the rule table 144 as a cache.

In some embodiments, the tag processing hardware 140 may form a hash key based on one or more input metadata tags, and may present the hash key to the rule table 144. If there is no match, the tag processing hardware 140 may send an interrupt signal to the policy processor 150. In response to the interrupt signal, the policy processor 150 may fetch metadata from one or more input registers (e.g., where the one or more input metadata tags are stored), process the fetched metadata, and write one or more results to one or more output registers. The policy processor 150 may then signal to the tag processing hardware 140 that the one or more results are available.

In some embodiments, if the tag processing hardware 140 determines that an instruction (e.g., a store instruction) is allowed (e.g., based on a match in the rule table 144, or no match in the rule table 144, followed by a response from the policy processor 150 indicating no policy violation has been found), the tag processing hardware 140 may indicate to the write interlock 112 that a result of executing the instruction (e.g., a value to be stored) may be written to memory.

Additionally, or alternatively, the tag processing hardware 140 may update the metadata memory 125, the tag map table 142, and/or the tag register file 146 with one or more output metadata tags (e.g., as received from the rule table 144 or the policy processor 150). As one example, for a store instruction, the metadata memory 125 may be updated based on an address translation by the tag map table 142. For instance, an application memory address referenced by the store instruction may be used to look up a metadata memory address from the tag map table 142, and metadata received from the rule table 144 or the policy processor 150 may be stored to the metadata memory 125 at the metadata memory address.

As another example, where metadata to be updated is stored in an entry in the tag map table 142 (as opposed to being stored in the metadata memory 125), that entry in the tag map table 142 may be updated.

As another example, for an arithmetic instruction, an entry in the tag register file 146 corresponding to a register used by the host processor 110 for storing a result of executing the arithmetic instruction may be updated with an appropriate metadata tag.

In some embodiments, if the tag processing hardware 140 determines that the instruction represents a policy violation (e.g., based on no match in the rule table 144, followed by a response from the policy processor 150 indicating a policy violation has been found), the tag processing hardware 140 may indicate to the write interlock 112 that a result of executing the instruction should be discarded, instead of being written to memory.

Additionally, or alternatively, the tag processing hardware 140 may send an interrupt to the host processor 110. In response to receiving the interrupt, the host processor 110 may switch to any suitable violation processing code. For example, the host processor 100 may halt, reset, log the violation and continue, perform an integrity check on application code and/or application data, notify an operator, etc.

In some embodiments, the rule table 144 may be implemented with a hash function and a designated portion of a memory (e.g., the metadata memory 125). For instance, a hash function may be applied to one or more inputs to the rule table 144 to generate an address in the metadata memory 125. A rule entry corresponding to the one or more inputs may be stored to, and/or retrieved from, that address in the metadata memory 125. Such an entry may include the one or more inputs and/or one or more corresponding outputs, which may be computed from the one or more inputs at run time, load time, link time, or compile time.

In some embodiments, the tag processing hardware 140 may include one or more configuration registers. Such a register may be accessible (e.g., by the policy processor 150) via a configuration interface of the tag processing hardware 140. In some embodiments, the tag register file 146 may be implemented as configuration registers.

Additionally, or alternatively, there may be one or more application configuration registers and/or one or more metadata configuration registers. An application configuration register may be accessible by the host processor 110 and/or the policy processor 150, whereas a metadata configuration register may only be accessible by the policy processor 150. In this manner, software code executing on the host processor 110 may not have access to the metadata configuration register, and therefore may not be able to interfere with metadata processing.

Although details of implementation are shown in FIG. 1 and described above, it should be appreciated that aspects of the present disclosure are not limited to using any particular component, or combination of components, or to any particular arrangement of components. For instance, in some embodiments, one or more functionalities of the policy processor 150 may be performed by the host processor 110. As an example, the host processor 110 may have different operating modes, such as a user mode for user applications and a privileged mode for an operating system. Policy-related code (e.g., tagging, evaluating policies, etc.) may run in the same privileged mode as the operating system, or a different privileged mode (e.g., with even more protection against privilege escalation).

Additionally, or alternatively, one or more functionalities implemented in software (e.g., via instructions executed by a processor, or otherwise at software speed) may instead be implemented in hardware (e.g., via programmable and/or fabricated logic, or otherwise at hardware speed), and/or vice versa. For instance, one or more functionalities implemented by the policy processor 150 may instead be implemented by the tag processing hardware 140, and/or vice versa.

Figure 2:
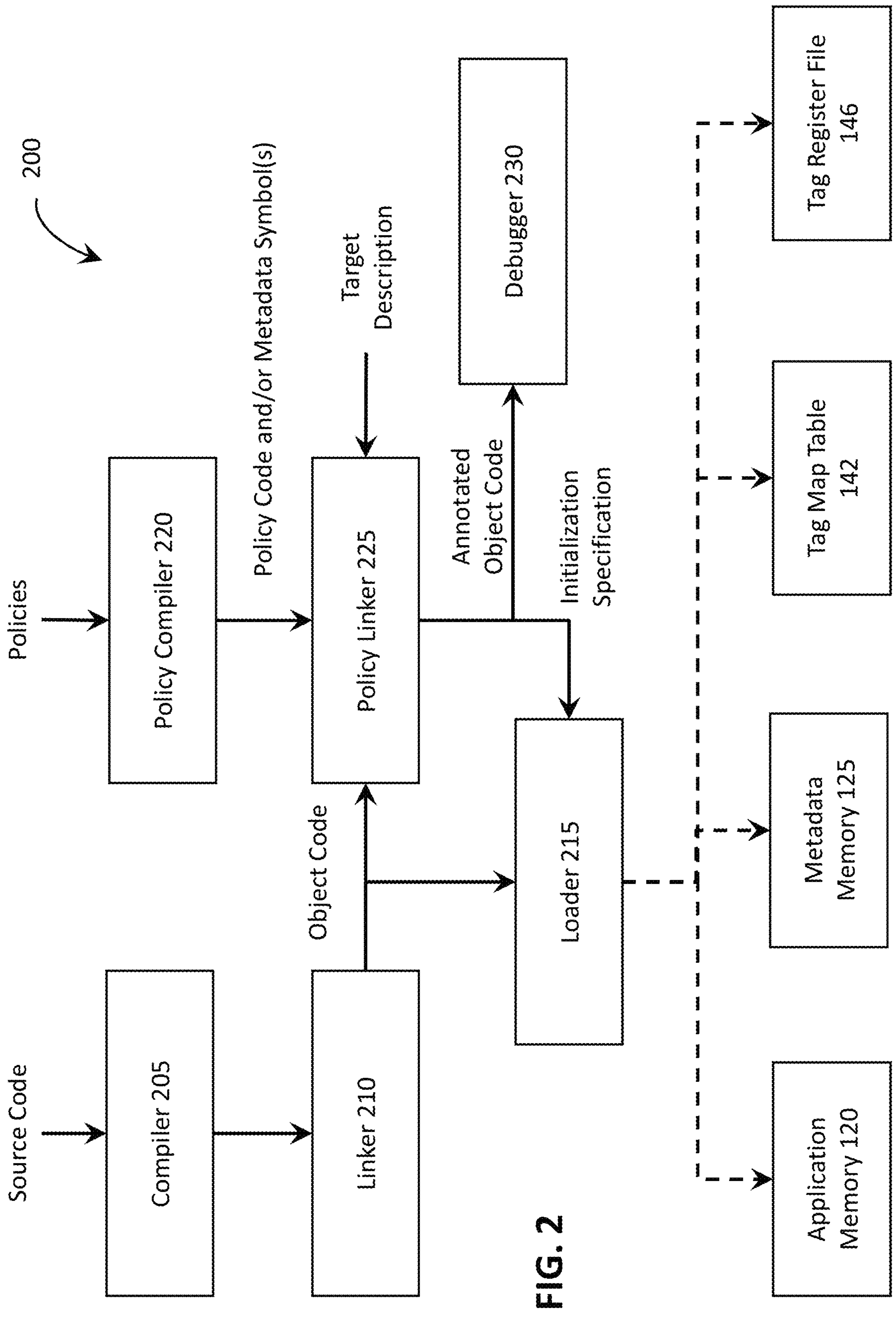
FIG. 2 shows an illustrative software system 200 for enforcing policies, in accordance with some embodiments.

FIG. 2 shows an illustrative software system 200 for enforcing policies, in accordance with some embodiments. For instance, the software system 200 may be programmed to generate executable code and/or load the executable code into the illustrative hardware system 100 in the example of FIG. 1.

In the example of FIG. 2, the software system 200 includes a software toolchain having a compiler 205, a linker 210, and a loader 215. The compiler 205 may be programmed to process source code into executable code, where the source code may be in a higher-level language and the executable code may be in a lower-level language. The linker 210 may be programmed to combine multiple object files generated by the compiler 205 into a single object file to be loaded by the loader 215 into memory (e.g., the illustrative application memory 120 in the example of FIG. 1). Although not shown, the object file output by the linker 210 may be converted into a suitable format and stored in persistent storage, such as flash memory, hard disk, read-only memory (ROM), etc. The loader 215 may retrieve the object file from the persistent storage, and load the object file into random-access memory (RAM).

In some embodiments, the compiler 205 may be programmed to generate information for use in enforcing policies. For instance, as the compiler 205 translates source code into executable code, the compiler 205 may generate information regarding data types, program semantics and/or memory layout. As one example, the compiler 205 may be programmed to mark a boundary between one or more instructions of a function and one or more instructions that implement calling convention operations (e.g., passing one or more parameters from a caller function to a callee function, returning one or more values from the callee function to the caller function, storing a return address to indicate where execution is to resume in the caller function's code when the callee function returns control back to the caller function, etc.). Such boundaries may be used, for instance, during initialization to tag certain instructions as function prologue or function epilogue. At run time, a stack policy may be enforced so that, as function prologue instructions execute, certain locations in a call stack (e.g., where a return address is stored) may be tagged as FRAME locations, and as function epilogue instructions execute, the FRAME metadata tags may be removed. The stack policy may indicate that instructions implementing a body of the function (as opposed to function prologue and function epilogue) only have read access to FRAME locations. This may prevent an attacker from gaining control by overwriting a return address.

As another example, the compiler 205 may be programmed to perform control flow analysis, for instance, to identify one or more control transfer points and respective destinations. Such information may be used in enforcing a control flow policy.

As yet another example, the compiler 205 may be programmed to perform type analysis, and may apply type labels (e.g., Pointer, Integer, Floating-Point Number, etc.) to entities in object code output by the compiler 205. Such information may be used to enforce a policy that prevents misuse (e.g., using a floating-point number as a pointer). In some instances, type labels may be applied to symbols representing the entities. Additionally, or alternatively, type labels may be stored in a manner that associates the type labels with the entities. For instance, a type label may be stored in a manner that associates the type label with a relative address of an entity in the object code.

Although not shown in FIG. 2, the software system 200 may, in some embodiments, include a binary analysis component programmed to take, as input, object code produced by the linker 210 (as opposed to source code), and perform one or more analyses similar to those performed by the compiler 205 (e.g., control flow analysis, type analysis, etc.).

In the example of FIG. 2, the software system 200 further includes a policy compiler 220 and a policy linker 225. The policy compiler 220 may be programmed to translate one or more policies written in a policy language into policy code. For instance, the policy compiler 220 may output policy code in C or some other suitable programming language. Additionally, or alternatively, the policy compiler 220 may output one or more metadata labels referenced by the one or more policies.

In some embodiments, a metadata label may, at initialization, be associated with one or more memory locations, registers, and/or other machine state of a target system. For instance, the metadata label may be resolved into a binary representation of metadata to be loaded into a metadata memory or some other hardware storage (e.g., registers) of the target system, and an association may be created via a tag map table entry (e.g., as described in connection with the illustrative tag map table 142 in the example of FIG. 1). As discussed above, such a binary representation of metadata, or a pointer to a location at which the binary representation is stored, may be referred to herein as a "metadata tag."

It should be appreciated that aspects of the present disclosure are not limited to resolving metadata labels at load time. In some embodiments, one or more metadata labels may be resolved statically (e.g., at compile time or link time). For example, the policy compiler 220 may process one or more applicable policies, and resolve one or more metadata labels defined by the one or more policies into a statically-determined binary representation. Additionally, or alternatively, the policy linker 225 may resolve one or more metadata labels into a statically-determined binary representation, or a pointer to a data structure storing a statically-determined binary representation. The inventor has recognized and appreciated that resolving metadata labels statically may advantageously reduce load time processing. However, aspects of the present disclosure are not limited to resolving metadata labels in any particular manner.

In some embodiments, the policy linker 225 may be programmed to process object code (e.g., as output by the linker 210), policy code (e.g., as output by the policy compiler 220), and/or a target description, to output an initialization specification. The initialization specification may be used by the loader 215 to securely initialize a target system having one or more hardware components (e.g., the illustrative hardware system 100 in the example of FIG. 1) and/or one or more software components (e.g., an operating system, one or more user applications, etc.).

In some embodiments, a target description may include descriptions of a plurality of named entities. A named entity may represent a component of a target system. As one example, a named entity may represent a hardware component, such as a configuration register, a program counter, a register file, a timer, a status flag, a memory transfer unit, an input/output device, etc. As another example, a named entity may represent a software component, such as a function, a module, a driver, a service routine, etc.

In some embodiments, the policy linker 225 may be programmed to search the target description to identify one or more entities to which a policy pertains. For instance, the policy may map certain entity names to corresponding metadata labels, and the policy linker 225 may search the target description to identify entities having those entity names.

Given an entity matching a certain entity name, the policy linker 225 may identify a description of the entity from the target description, and use the description to annotate, with one or more appropriate metadata labels, the object code output by the linker 210. For instance, the policy linker 225 may apply a Read label to a .rodata section of an Executable and Linkable Format (ELF) file, a Read label and a Write label to a .data section of the ELF file, and an Execute label to a .text section of the ELF file. Such information may be used to enforce a policy for memory access control and/or executable code protection (e.g., by checking read, write, and/or execute privileges).

It should be appreciated that aspects of the present disclosure are not limited to providing a target description to the policy linker 225. In some embodiments, a target description may be provided to the policy compiler 220, in addition to, or instead of, the policy linker 225. The policy compiler 220 may check the target description for errors. For instance, if an entity referenced in a policy does not exist in the target description, an error may be flagged by the policy compiler 220.

Additionally, or alternatively, the policy compiler 220 may search the target description for entities that are relevant for one or more policies to be enforced, and may produce a filtered target description that includes entities descriptions for the relevant entities only. For instance, the policy compiler 220 may match an entity name in an "init" statement of a policy to an entity description in the target description, and may remove from the target description (or simply ignore) entity descriptions with no corresponding "init" statement.

In some embodiments, the loader 215 may initialize a target system based on an initialization specification produced by the policy linker 225. For instance, referring to the example of FIG. 1, the loader 215 may load data and/or instructions into the application memory 120, and may use the initialization specification to identify metadata labels associated with the data and/or instructions being loaded into the application memory 120. The loader 215 may resolve the metadata labels in the initialization specification into respective binary representations, store the binary representations in a metadata memory (e.g., the illustrative metadata memory 125) and/or a register file (e.g., the illustrative tag register file 146), and/or creating associations via tag map table entries (e.g., as described in connection with the illustrative tag map table 142).

However, as discussed above, it should be appreciated that aspects of the present disclosure are not limited to resolving metadata labels at load time. In some embodiments, a universe of metadata labels may be known during policy compilation or linking, and therefore metadata labels may be resolved at compile time (e.g., by the policy compiler 220) or at link time (e.g., by the policy linker 225), and may be stored in the initialization specification. This may advantageously reduce load time processing of the initialization specification.

In some embodiments, the policy linker 225 and/or the loader 215 may maintain a mapping of binary representations of metadata back to human-readable versions of metadata labels. Such a mapping may be used, for example, by a debugger 230. For instance, in some embodiments, the debugger 230 may be provided to display a human-readable version of an initialization specification, which may list one or more entities and, for each entity, a metadata label (e.g., a set of one or more metadata symbols) associated with the entity.

Additionally, or alternatively, the debugger 230 may be programmed to display assembly code annotated with metadata labels, such as assembly code generated by disassembling object code annotated with metadata labels. During debugging, the debugger 230 may halt a program during execution, and allow inspection of entities and/or metadata tags associated with the entities, in human-readable form. For instance, the debugger 230 may allow inspection of an entity involved in a policy violation and/or one or more metadata tags that caused the policy violation. The debugger 230 may do so using the mapping of binary representations of metadata back to metadata labels.

In some embodiments, a conventional debugging tool may be extended to allow review of issues related to policy enforcement, for example, as described above. Additionally, or alternatively, a stand-alone policy debugging tool may be provided.

In some embodiments, the loader 215 may load binary representations of metadata labels into the metadata memory 125, and may record a mapping between application memory addresses and metadata memory addresses in the tag map table 142. For instance, the loader 215 may create an entry in the tag map table 142 that maps an application memory address where an instruction is stored in the application memory 120, to a metadata memory address where metadata associated with the instruction is stored in the metadata memory 125. Additionally, or alternatively, the loader 215 may store metadata in the tag map table 142 itself (as opposed to the metadata memory 125), to allow access to such metadata without performing any memory operation.

In some embodiments, the loader 215 may initialize the tag register file 146 in addition to, or instead of, the tag map table 142. For instance, the tag register file 146 may include a plurality of registers corresponding, respectively, to a plurality of entities. The loader 215 may identify, from the initialization specification, metadata associated with the entities, and store the metadata in the respective registers in the tag register file 146.

Referring again to the example of FIG. 1, the loader 215 may, in some embodiments, load policy code (e.g., as output by the policy compiler 220) into the metadata memory 125 for execution by the policy processor 150. Additionally, or alternatively, a separate memory (not shown in FIG. 1) may be provided for use by the policy processor 150, and the loader 215 may load policy code and/or associated data into the separate memory.

In some embodiments, upon completion of loading of metadata and policy code, the loader 215 may notify the illustrative tag processing hardware 140 in the example of FIG. 1. In response, the tag processing hardware 140 may begin enforcing one or more policies according to the metadata and the policy code.

In some embodiments, a metadata label may be based on multiple metadata symbols. For instance, an entity may be subject to multiple policies, and may therefore be associated with different metadata symbols corresponding, respectively, to the different policies. The inventor has recognized and appreciated that it may be desirable that metadata labels consisting of the same set of metadata symbols be resolved by the loader 215 to the same binary representation (which may be referred to herein as a "canonical" representation). For instance, a metadata label {A, B, C} and a metadata label {B, A, C} may be resolved by the loader 215 to the same binary representation. In this manner, metadata labels that are syntactically different but semantically equivalent may have the same binary representation.

The inventor has further recognized and appreciated it may be desirable to ensure that a binary representation of metadata is not duplicated in metadata storage. For instance, as described above, the illustrative rule table 144 in the example of FIG. 1 may map input metadata tags to output metadata tags, and, in some embodiments, the input metadata tags may be metadata memory addresses where binary representations of metadata are stored, as opposed to the binary representations themselves. The inventor has recognized and appreciated that if the same binary representation of metadata is stored at two different metadata memory addresses X and Y, the rule table 144 may not recognize an input pattern having the metadata memory address Y as matching a stored mapping having the metadata memory address X. This may result in a large number of unnecessary rule misses, which may degrade system performance.

Moreover, the inventor has recognized and appreciated that having a one-to-one correspondence between binary representations of metadata and their storage locations may facilitate metadata comparison. For instance, equality between two pieces of metadata may be determined simply by comparing metadata memory addresses, as opposed to comparing binary representations of metadata. This may result in significant performance improvement, especially where the binary representations are large (e.g., many metadata symbols packed into a single metadata label).

Accordingly, in some embodiments, the loader 215 may, prior to storing a binary representation of metadata (e.g., into the metadata memory 125), check if the binary representation of metadata has already been stored. If the binary representation of metadata has already been stored, instead of storing it again at a different storage location, the loader 215 may refer to the existing storage location. Such a check may be done at startup and/or when a program is loaded subsequent to startup (with or without dynamic linking).

Additionally, or alternatively, a similar check may be performed when a binary representation of metadata is created as a result of evaluating one or more policies (e.g., by the policy processor 150). If the binary representation of metadata has already been stored, a reference to the existing storage location may be used (e.g., installed in the rule table 144).

In some embodiments, the loader 215 may create a hash table mapping hash values to storage locations. Before storing a binary representation of metadata, the loader 215 may use a hash function to reduce the binary representation of metadata into a hash value, and check if the hash table already contains an entry associated with the hash value. If so, the loader 215 may determine that the binary representation of metadata has already been stored, and may retrieve, from the hash table entry, information relating to the binary representation of metadata (e.g., a pointer to the binary representation of metadata, or a pointer to that pointer).

If the hash table does not already contain an entry associated with the hash value, the loader 215 may store the binary representation of metadata (e.g., to a register or a location in a metadata memory), create a new entry in the hash table in association with the hash value, and store appropriate information in the new entry (e.g., a register identifier, a pointer to the binary representation of metadata in the metadata memory, a pointer to that pointer, etc.).

However, it should be appreciated that aspects of the present disclosure are not limited to using a hash table to keep track of binary representations of metadata that have already been stored. Additionally, or alternatively, other data structures may be used, such as a graph data structure, a sorted list, an unsorted list, etc. Any suitable data structure or combination of data structures may be selected based on any suitable criterion or combination of criteria, such as access time, memory usage, etc.

It should be appreciated that the techniques introduced above and/or described in greater detail below may be implemented in any of numerous ways, as these techniques are not limited to any particular manner of implementation. Examples of implementation details are provided herein solely for purposes of illustration. Furthermore, the techniques disclosed herein may be used individually or in any suitable combination, as aspects of the present disclosure are not limited to any particular technique or combination of techniques.

For instance, while examples are described herein that include a compiler (e.g., the illustrative compiler 205 and/or the illustrative policy compiler 220 in the example of FIG. 2), it should be appreciated that aspects of the present disclosure are not limited to using a compiler. In some embodiments, a software toolchain may be implemented as an interpreter. For example, a lazy initialization scheme may be implemented, where one or more default labels (e.g., {DEFAULT}, {PLACEHOLDER}, etc.) may be used for tagging at startup, and a policy processor (e.g., the illustrative policy processor 150 in the example of FIG. 1) may evaluate one or more policies and replace the one or more default labels in a just-in-time manner.

Figure 3A:
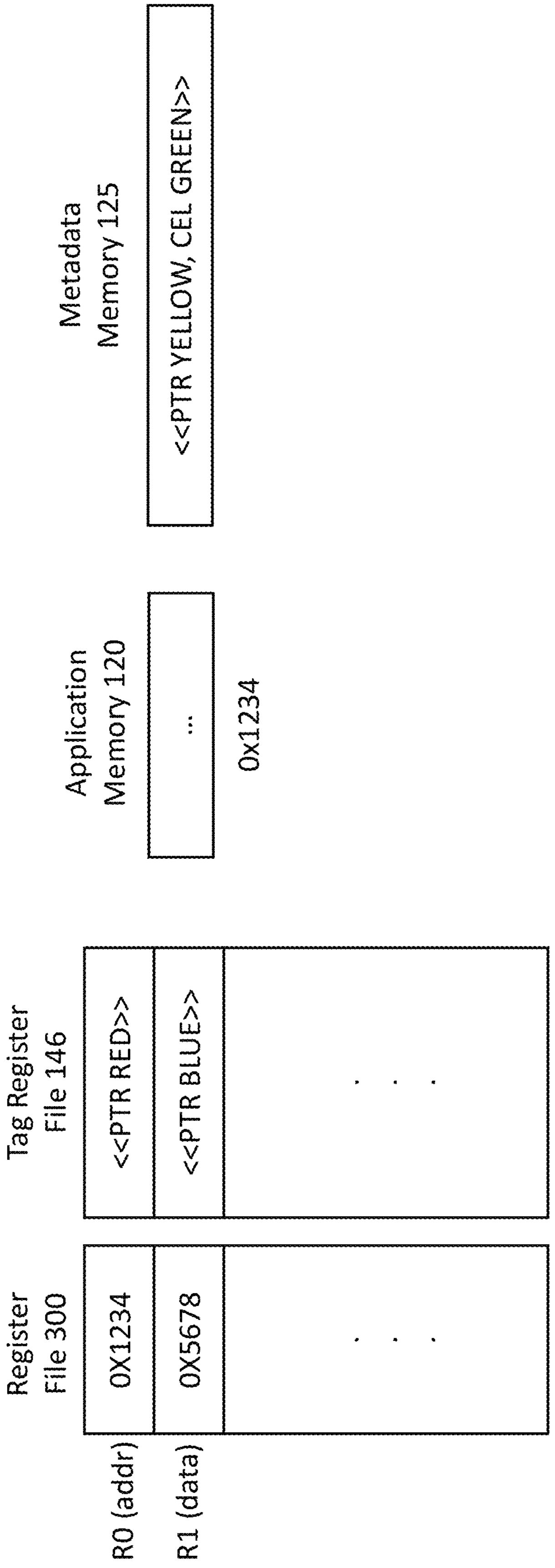
FIG. 3A shows an illustrative register file 300, in accordance with some embodiments.

FIG. 3A shows an illustrative register file 300, in accordance with some embodiments. The register file 300 may be a register file of a host processor (e.g., the illustrative host processor 110 in the example of FIG. 1), and may include a plurality of registers, such as registers R0, R1, etc.

In some embodiments, the host processor 110 may execute a store instruction to write data to a location in an application memory (e.g., the illustrative application memory 120 in the example of FIG. 1). An address (e.g., 0x1234) of the application memory location may be stored in an address register (e.g., R0), and the data to be written may be stored in a data register (e.g., R1).

In some embodiments, each register in the register file 300 may have a corresponding tag register for storing metadata. The corresponding tag registers may be in a tag register file (e.g., the illustrative tag register file 146 in the example of FIG. 1).

In some embodiments, a policy language may be provided that allows declaration of metadata symbols using algebraic data types. As an example, there may be a metadata type Color, which may have values such as RED, BLUE, YELLOW, GREEN, etc. A constructor PTR may be applied to the metadata type Color to obtain a new metadata type PTR Color, which may have values such as PTR RED, PTR BLUE, PTR YELLOW, and PTR GREEN. Intuitively, an association with such a metadata symbol may be interpreted as a statement, "this is a red pointer," "this is a blue pointer," "this is a yellow pointer," "this is a green pointer," etc.

Additionally, or alternatively, a constructor CEL may be applied to the metadata type Color to obtain a new metadata type CEL Color, which may have values such as CEL RED, CEL BLUE, CEL YELLOW, CEL GREEN, etc. Intuitively, an association with such a metadata symbol may be interpreted as a statement, "this is a red cell," "this is a blue cell," "this is a yellow cell," "this is a green cell," etc.

Referring again to the example of FIG. 3A, the address register R0 may have a corresponding tag register in the tag register file 146, and the corresponding tag register may store a binary representation (denoted <<PTR RED>>) of a metadata label {PTR RED}. Likewise, the register R1 may have a corresponding tag register in the tag register file 146, and the corresponding tag register may store a binary representation (denoted <<PTR BLUE>>) of a metadata label {PTR BLUE}.

Additionally, or alternatively, the application memory address stored in the address register R0 (e.g., 0x1234) may have a corresponding address in a metadata memory (e.g., the illustrative metadata memory 125 in the example of FIG. 1). Metadata associated with the application memory address may be stored at the corresponding metadata memory address. For instance, in the example of FIG. 3A, a binary representation (denoted <<PTR YELLOW, CEL GREEN>>) of a metadata label {PTR YELLOW, CEL GREEN} may be stored at the metadata memory address corresponding to the application memory address 0x1234. Intuitively, an association with this metadata label may be interpreted as a statement, "this is a green cell with a yellow pointer stored therein."

In some embodiments, tag processing hardware (e.g., the illustrative tag processing hardware 140 in the example of FIG. 1) may apply one or more policies to determine whether the store instruction should be allowed to write content of the data register R1 to the application memory address 0x1234. For instance, the tag processing hardware 140 may construct an input metadata pattern, and may use the input metadata pattern to query a policy processor and/or a rule table (e.g., the illustrative policy processor 150 and/or the illustrative rule table 144 in the example of FIG. 1).

As an example, an access control policy may be provided that, when enforced, causes the tag processing hardware 140 to check whether metadata associated with an address register matches metadata associated an application memory address stored in the address register. For instance, the metadata may include colors, where each color may represent a user, an application instance, etc. that is subject to access control.

In the example of FIG. 3A, the metadata label {PTR RED} is associated with the address register R0, but the metadata label {PTR YELLOW, CEL GREEN} is associated with the application memory address 0x1234. Thus, the store instruction is attempting to use a red pointer to access a green cell. Because of this mismatch, the tag processing hardware 140 may indicate to the host processor 110 that the store instruction violates the access control policy and therefore is not allowed.

Figure 3B:
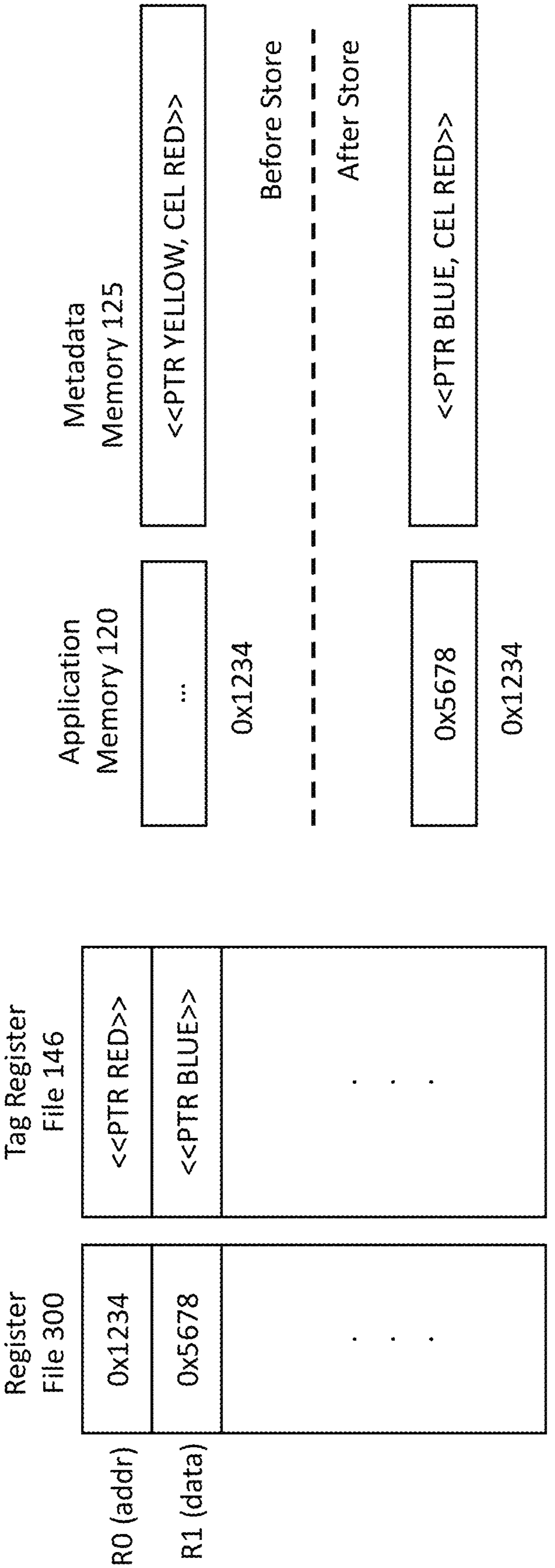
FIG. 3B shows another example involving the illustrative register file 300 of FIG. 3A, in accordance with some embodiments.

FIG. 3B shows another example involving the illustrative register file 300 of FIG. 3A, in accordance with some embodiments. This example may be similar to that of FIG. 3A, except the application memory address 0x1234 is associated with a metadata label {PTR YELLOW, CEL RED} (as opposed to {PTR YELLOW, CEL GREEN}, as in the example of FIG. 3A). Thus, the store instruction is attempting to use a red pointer to access a red cell. Accordingly, the tag processing hardware 140 may determine that the store instruction complies with the access control policy and therefore is allowed (assuming the store instruction does not violate any other policy that is concurrently enforced).

In some embodiments, an information flow policy may be provided that, when enforced, causes the tag processing hardware 140 to update metadata. For instance, in the example of FIG. 3B, the data register R1 is associated with the metadata label {PTR BLUE}, indicating that content of the data register R1 (which may be another application memory address, e.g., 0x5678) is a blue pointer. Accordingly, upon execution of the store instruction, the content of the data register R1 is written to the application memory address 0x1234, and the tag processing hardware 140 may perform a metadata update to associate the application memory address 0x1234 with a new metadata label, {PTR BLUE, CEL RED}.

As described above, the tag processing hardware 140 may, in some embodiments, construct an input metadata pattern for use in querying the policy processor 150 and/or the rule table 144. The input metadata pattern may include one or more metadata labels occupying one or more respective input slots, such as the following.

1) An input slot [op] may receive a metadata label indicating an instruction type (e.g., LOAD, STORE, etc.) of an instruction being checked.
2) An input slot [env] may receive a metadata label associated with a state of the host processor 110. Such a state may include one or more registers, such as a program counter, a control and status register, etc.
3) An input slot [code] may receive a metadata label associated with the instruction being checked (e.g., a metadata label associated with a memory location from which the instruction is fetched).
4) An input slot [addr] may receive a metadata label associated with an address register used by the instruction being checked (e.g., the metadata label {PTR RED}, which is associated with the address register R0 in the example of FIG. 3B).
5) An input slot [data] may correspond to a metadata label associated with a data register used by the instruction being checked (e.g., the metadata label {PTR BLUE}, which is associated with the data register R1 in the example of FIG. 3B).
6) An input slot [mem] may correspond to a metadata label associated with a memory location referenced by the instruction being checked (e.g., the metadata label {PTR YELLOW, CEL RED}, which is associated with the application memory address 0x1234 in the example of FIG. 3B before execution of the instruction).

The inventor has recognized and appreciated that metadata labels for some input slots may become available sooner than metadata labels for other input slots. For instance, metadata labels for the input slots [env] and [code] may be determined based on information that is available at an instruction fetch stage of the host processor 110. Such metadata labels may be referred to herein as "operation" metadata labels.

In some instances, a metadata label for the input slot [op] may be determined without decoding a fetched instruction. Thus, such a metadata label may be considered an operation metadata label.

By contrast, metadata labels for the input slots [addr], [data], and [mem] may be determined based on information that becomes available later, for example, at an instruction decode stage, a register fetch stage, a memory access stage, and/or a writeback stage of the host processor 110. Such metadata labels may be referred to herein as "operand" metadata labels.

The inventor has recognized that metadata associated with registers may be updated continually as instructions are executed by the host processor 110 and checked by the tag processing hardware 140. For instance, the host processor 110 may execute a first instruction followed by a second instruction. When the first instruction is checked, the tag processing hardware 140 may update a tag register storing metadata associated with a data or address register used by the second instruction. As a result, if the tag processing hardware 140 checks the second instruction slightly behind the first instruction (e.g., via pipelining), the tag processing hardware 140 may access the tag register too early, and may obtain an out-of-date metadata label (e.g., a metadata label stored in the tag register before the tag register is updated as a result of checking the first instruction).

Accordingly, in some embodiments, the tag processing hardware 140 may be configured to keep track of instructions being checked and tag registers that may be updated as a result of checking the instructions. For example, the tag processing hardware 140 may record an identifier of such a tag register in a selected data structure, and may remove the identifier when a corresponding instruction has been checked (with or without updating the tag register).

Thus, an identifier of a tag register may appear multiple times in the selected data structure, where each instance may correspond to a different instruction. Such an instance may be added when checking of the corresponding instruction commences, and removed when such checking is completed.

In some embodiments, for each instruction being checked (hereafter, the current instruction), the tag processing hardware 140 may determine if the selected data structure includes any instance of an identifier of any tag register storing metadata associated with a data or address register used by the current instruction. If so, the tag processing hardware 140 may determine if any such instance is associated with an instruction executed by the host processor 110 prior to the current instruction (hereafter, a prior instruction). If so, the tag processing hardware 140 may determine that the tag register has a pending update, and may wait until the selected data structure no longer includes any instance of the identifier of the tag register that is associated with a prior instruction.

The inventor has recognized and appreciated that metadata updates may happen relatively infrequently. Therefore, it may be more performant to access a tag register without waiting. If the accessed metadata turns out to be stale, the tag processing hardware 140 may check a corresponding instruction again using up-to-date metadata. Such a performance penalty may occur infrequently, and therefore may be considered acceptable.

Accordingly, in some embodiments, the tag processing hardware 140 may be configured to access a metadata label from a tag register associated with a data or address register used by a current instruction, and proceed to use the metadata label to check the current instruction, while keeping track of instructions being checked and tag registers that may be updated as a result of checking the instructions, as described above. If the tag register is updated as a result of checking a prior instruction, the tag processing hardware 140 may access a new metadata label from the tag register, and may check the current instruction again using the new metadata label.

Additionally, or alternatively, the tag processing hardware 140 may be configured to keep track of which tag registers (e.g., in the illustrative tag register file 146 in the example of FIG. 1) are actively being used to check instructions. An update to such a tag register may trigger replacement of a metadata label accessed from the tag register with a new metadata label.

In some embodiments, the tag processing hardware 140 may use one or more operation metadata labels to determine how one or more operand metadata labels are to be processed. For instance, information obtained from an operation metadata label may be used to look up a transformation (e.g., a mask) to be applied to information obtained from one or more operand metadata labels. Additionally, or alternatively, information obtained from an operation metadata label may be used to configure a hardware block that processes information obtained from one or more operand metadata labels. Such lookup and/or configuration may be done before the one or more operand metadata labels become available, which may improve run time performance.

However, it should be appreciated that aspects of the present disclosure are not limited to performing any particular task or combination of tasks, at any particular time, based on information obtained from an operation metadata label, or at all.

In some embodiments, a query response may include a Boolean value indicating whether the instruction being checked is allowed. Additionally, or alternatively, a query response may include an output metadata pattern, which may, in turn, include one or more metadata labels occupying one or more respective output slots, such as the following.

1) An output slot [env'] having a metadata label to be associated with the state of the host processor 110 after execution of the instruction.
2) An output slot [data'] having a metadata label to be associated with the data register after execution of the instruction.
    a. As an example, the instruction may be a load instruction, and the data register may be used to hold data loaded from memory.
3) An output slot [mem'] having a metadata label to be associated with the memory location referenced by the instruction (e.g., the metadata label {PTR BLUE, CEL RED}, which is associated with the application memory address 0x1234 in the example of FIG. 3B after execution of the store instruction).

To enforce the illustrative access control policy and the illustrative information flow policy described above, the tag processing hardware 140 may, in some embodiments, store binary representations of one or more rules, such as the following, in the rule table 144.

Policy Check and Metadata Update Rules

If op=={STORE} and addr=={PTR RED} and data=={PTR RED} and mem=={PTR RED, CEL RED} then mem'={PTR RED, CEL RED}

If op=={STORE} and addr=={PTR RED} and data=={PTR BLUE} and mem=={PTR RED, CEL RED} then mem'={PTR BLUE, CEL RED}

If op=={STORE} and addr=={PTR RED} and data=={PTR YELLOW} and mem=={PTR RED, CEL RED} then mem'={PTR YELLOW, CEL RED}

If op=={STORE} and addr=={PTR RED} and data=={PTR GREEN} and mem=={PTR RED, CEL RED} then mem'={PTR GREEN, CEL RED} ·

If op=={STORE} and addr=={PTR RED} and data=={PTR RED} and mem=={PTR YELLOW, CEL RED} then mem'={PTR RED, CEL RED}

If op=={STORE} and addr=={PTR RED} and data=={PTR BLUE} and mem=={PTR YELLOW, CEL RED} then mem'={PTR BLUE, CEL RED}

If op=={STORE} and addr=={PTR RED} and data=={PTR YELLOW} and mem=={PTR YELLOW, CEL RED} then mem'={PTR YELLOW, CEL RED}

If op=={STORE} and addr=={PTR RED} and data=={PTR GREEN} and mem=={PTR YELLOW, CEL RED} then mem'={PTR GREEN, CEL RED}

. . .

The inventor has recognized and appreciated that, as a number of users, application instances, etc. grows, a number of colors used to perform access control may grow, which may lead to an exponential growth in a number of rules to be stored in the rule table 144. If the rule table 144 is unable to accommodate a sufficiently large number of rules, rule misses may occur frequently. Thus, to prevent performance degradation, a large amount of memory (and hence circuit area) may be used to implement the rule table 144. This may reduce an amount of memory and/or circuit area available for implementing other functionalities.

The inventor has further recognized and appreciated that, for many policies, metadata updates do not involve elaborate computations. For instance, in the above example, a pointer color is simply propagated from the input slot [data] to the output slot [mem'].

Accordingly, in some embodiments, policy check (e.g., determining whether an instruction should be allowed) and output computation (e.g., determining whether/how to perform metadata update) may be implemented via separate hardware blocks. In this manner, output computation may be performed via hardware logic (e.g., programmable and/or fabricated logic), in addition to, or instead of, the rule table 144. This may improve run time performance, reduce power consumption, and/or reduce an amount of memory (and hence circuit area) used to implement the rule table 144.[1]

[1] As described below, policy check may, in some embodiments, also be implemented via hardware logic (e.g., programmable or fabricated logic), in addition to, or instead of, the rule table 144.

Figure 4A:
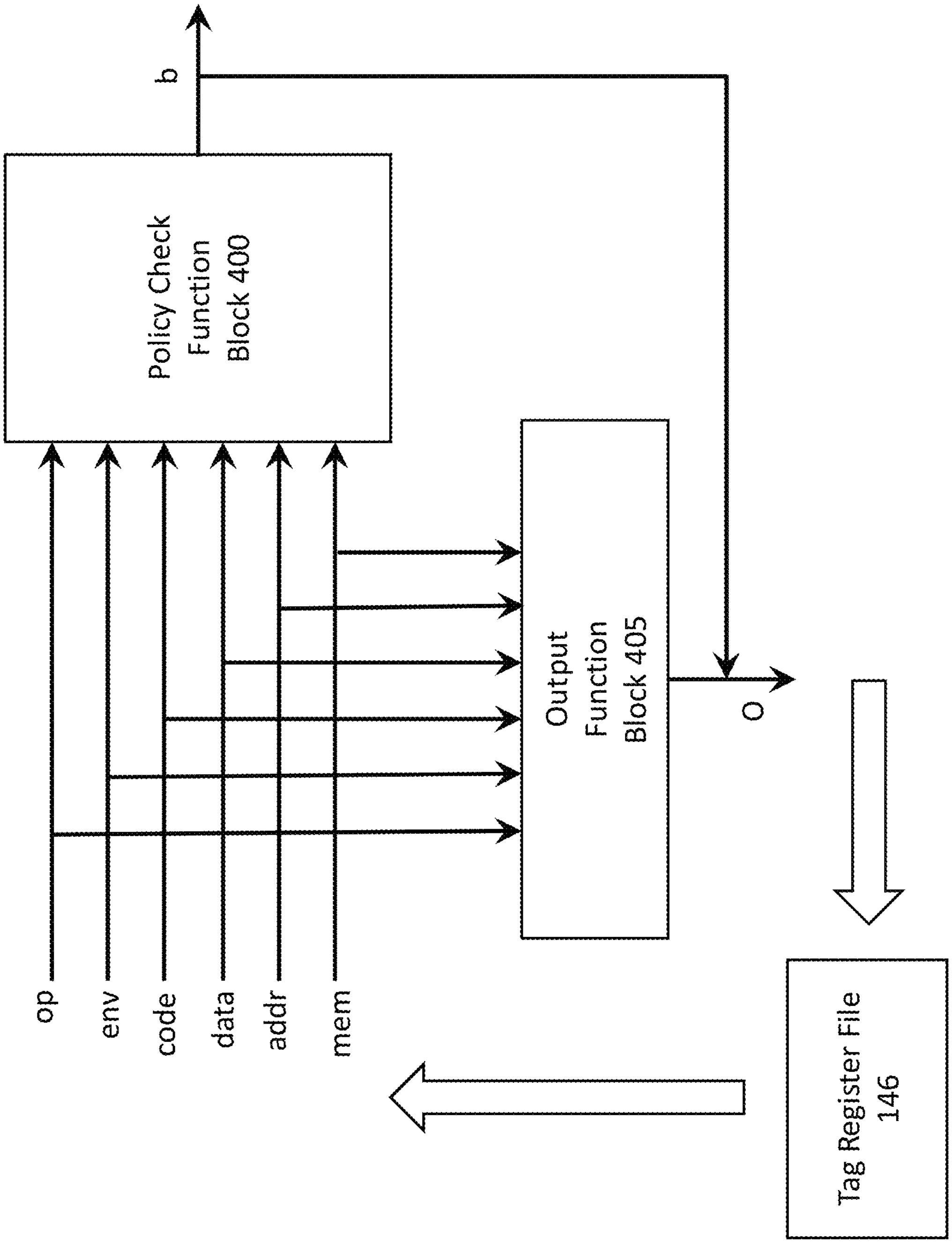
FIG. 4A shows an illustrative policy check function block 400 and an illustrative output function block 405, in accordance with some embodiments.

FIG. 4A shows an illustrative policy check function block 400 and an illustrative output function block 405, in accordance with some embodiments. The policy check function block 400 and the output function block 405 may be part of the illustrative tag processing hardware 140 in the example of FIG. 1.

In the example of FIG. 4A, each of the policy check function block 400 and the output function block 405 receives, as input, a binary representation of an input metadata pattern, which may include binary representations of six input metadata labels. In some embodiments, the metadata labels (in binary form) are received via respective input slots, such as [op], [env], [code], [addr], [data], and [mem] as described above. However, it should be appreciated that aspects of the present disclosure are not limited to any particular number or combination of input metadata labels.

In some embodiments, the policy check function block 400 may, in response to receiving an input metadata pattern (in binary form), provide a Boolean value b indicating whether an instruction giving rise to the input metadata pattern is allowed.

By contrast, the output function block 405 may, in response to receiving an input metadata pattern (in binary form), provide a binary representation of an output metadata pattern O, which may include binary representations of one or more output metadata labels.

In some embodiments, a Boolean value provided by the policy check function block 400 may be used as a gating signal for the output function block 405. Thus, if the policy check function block 400 determines that an instruction is not allowed, no metadata update may be provided by the output function block 405.

If, on the other hand, the policy check function block 400 determines that an instruction is allowed, the tag processing hardware 140 may use an output metadata pattern (in binary form) provided by the output function block 405 to update one or more tag registers in a tag register file (e.g., the illustrative tag register file 146 in the example of FIG. 1).

Additionally, alternatively, the tag processing hardware 140 may update a tag map table and/or a metadata memory (e.g., the illustrative tag map table 142 and/or the illustrative metadata memory 125 in the example of FIG. 1) (not show in FIG. 4A).

The policy check function block 400 may be implemented in any suitable manner. For instance, in some embodiments, the policy check function block 400 may include the illustrative rule table 144 in the example of FIG. 1, which may have stored therein binary representations of one or more rules, such as the following.

Policy Check Rules

If op=={STORE} and addr=={PTR RED} and mem=={PTR RED, CEL RED} then the instruction is allowed If op=={STORE} and addr=={PTR RED} and mem=={PTR BLUE, CEL RED} then the instruction is allowed If op=={STORE} and addr=={PTR RED} and mem=={PTR YELLOW, CEL RED} then the instruction is allowed If op=={STORE} and addr=={PTR RED} and mem=={PTR GREEN, CEL RED} then the instruction is allowed If op=={STORE} and addr=={PTR BLUE} and mem=={PTR RED, CEL BLUE} then the instruction is allowed If op=={STORE} and addr=={PTR BLUE} and mem=={PTR BLUE, CEL BLUE} then the instruction is allowed If op=={STORE} and addr=={PTR BLUE} and mem=={PTR YELLOW, CEL BLUE} then the instruction is allowed If op=={STORE} and addr=={PTR BLUE} and mem=={PTR GREEN, CEL BLUE} then the instruction is allowed

. . .

Additionally, or alternatively, as described further below, the policy check function block 400 may include hardware logic (e.g., programmable and/or fabricated logic) configured to implement a policy check function that maps binary representations of input metadata patterns to Boolean values. In some embodiments, the policy check function may be parameterized, and one or more parameter values may be chosen such that, given any input metadata pattern in a suitable set of input metadata patterns (which may be the set of all possible input metadata patterns, or a proper subset thereof), the policy check function 400 may map the input metadata pattern to 1 if and only if the input metadata pattern satisfies one of the above policy check rules.

The inventor has recognized and appreciated various advantages of implementing policy check and output computation via separate hardware blocks. For instance, the policy check function block 400 and the output function block 405 may operate in parallel, which may improve run time performance. Additionally, or alternatively, the policy check function block 400 and the output function block 405 may operate independently. As an example, the output function block 405 may map an input metadata pattern to an output metadata pattern independently of whether the input metadata pattern satisfies any policy check rule enforced by the policy check function block 400, or which policy check rule is satisfied.

Moreover, since the policy check function block 400 is no longer responsible for metadata update, the policy check function block 400 may be implemented in a more efficient manner. For instance, the policy check rules described above in connection with the example of FIG. 4A may be less numerous compared to the policy check and metadata update rules described above in connection with the example of FIG. 3B, because the input slot [data] is not referenced in the former.

In an embodiment in which the policy check function block 400 is implemented using the rule table 144, fewer rules may lead to a reduction in an amount of memory (and hence circuit area) used for the rule table 144 to achieve a given level of run time performance.

In an embodiment in which the policy check function block 400 is implemented via hardware logic (in addition to, or instead of, the rule table 144), fewer rules may likewise be desirable. For instance, each rule may be used as a constraint in a procedure for selecting one or more parameter values for the policy check function block 400. Thus, fewer rules may lead to fewer constraints, so that a solution may be found more readily.

Figure 4B:
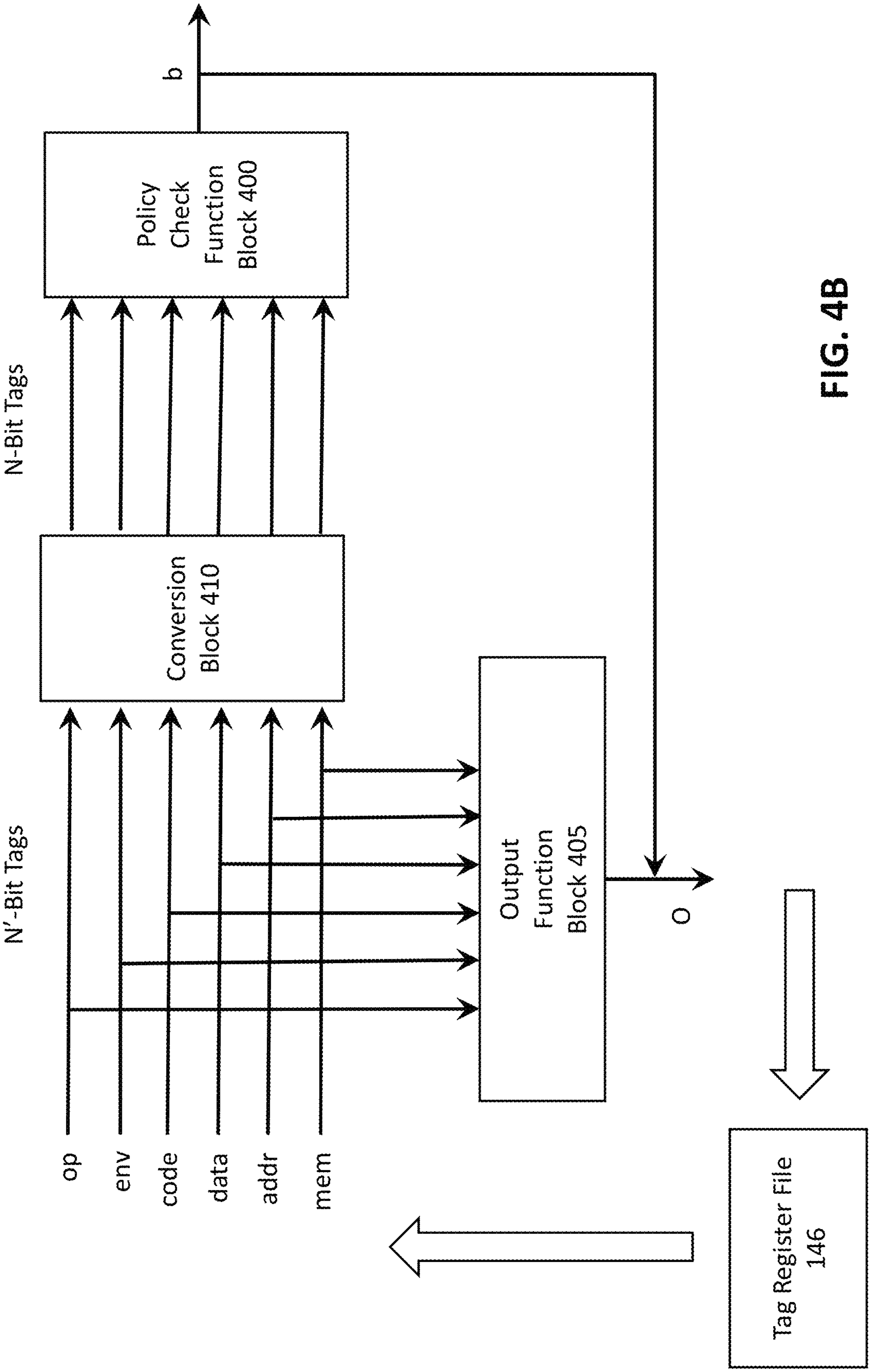
FIG. 4B shows an illustrative conversion block 410, in accordance with some embodiments.

FIG. 4B shows an illustrative conversion block 410, in accordance with some embodiments. The conversion block 410 may be used to convert input binary representations, for instance, according to a suitable encoding. Accordingly, a binary representation that is input to the conversion block 410 may be referred to herein as an "unencoded" representation of a metadata label, whereas a binary representation that is output by the conversion block 410 may be referred to herein as an "encoded" representation of the same metadata label.

In the example of FIG. 4B, the policy check function block 400 receives encoded representations of metadata labels, whereas the output function block 405 receives unencoded representations. As explained below, this may advantageously allow the output function block 405 to parse a binary representation and apply different update semantics to different bit positions in the binary representation.

In some embodiments, the policy check function block 400 may be configured to receive, as input, encoded representations that are each N bits long, whereas the output function block 405 may be configured to receive, as input, unencoded representations that are each N' bits long. N may be less than, equal to, or greater than N'.

The encoding implemented by the conversion block 410 may be selected in any suitable manner. For instance, in some embodiments, the policy check function block 400 may be implemented via hardware logic (in addition to, or instead of, a rule table), and the encoding may be selected jointly with one or more parameter values of the policy check function block 400. As an example, the encoding and/or the one or more parameter values may be selected such that, given any input metadata pattern in a suitable set of input metadata patterns (which may be the set of all possible input metadata patterns, or a proper subset thereof), the policy check function 400 may map the input metadata pattern to 1 if and only if the input metadata pattern satisfies one or more policies being enforced (e.g., the illustrative access control policy described above).

The inventor has recognized and appreciated that, as N increases, so does a number of possible encodings of length-N' bit strings into length-N bit strings. Accordingly, in some embodiments, a sufficiently large N may be used so that a suitable encoding may be found. In such an embodiment, N may be greater than N', and the conversion block 410 may be an expansion block. However, it should be appreciated that aspects of the present disclosure are not limited to implementing the conversion block 410 as an expansion block or a compression block, or to using the conversion block 410 at all.

As mentioned above, the output function block 405 may, in some embodiments, be configured to parse a binary representation and apply different update semantics to different bit positions in the binary representation.

Figure 5A:
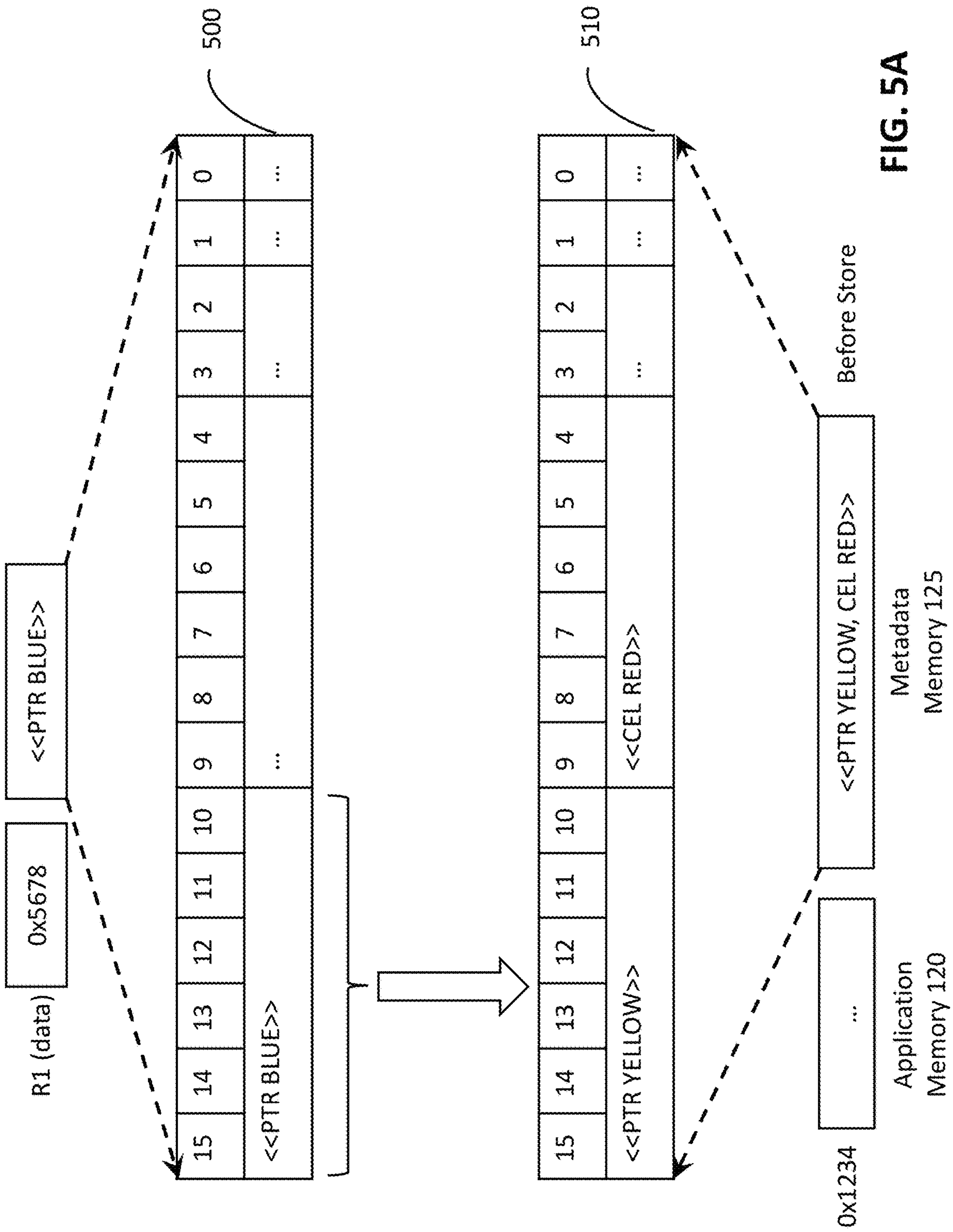
FIG. 5A shows illustrative binary representations 500 and 510, in accordance with some embodiments.

FIG. 5A shows illustrative binary representations 500 and 510, in accordance with some embodiments. For instance, the binary representation 500 may be stored in the tag register corresponding to the illustrative data register R1 in the example of FIG. 3B, whereas the binary representation 510 may be stored at the metadata memory address corresponding to the application memory address (e.g., 0x1234) stored in the illustrative address register R0.

In the example of FIG. 5A, the binary representations 500 and 510 are each 16 bits long (N'=16). However, it should be appreciated that aspects of the present disclosure are not limited to using binary representations of any particular length.

In some embodiments, bit positions in a binary representation may be grouped and/or allocated for different policies being enforced. For instance, the upper 6 bits of each the binary representations 500 and 510 may be allocated for the illustrative access control policy described in connection with the example of FIG. 3B, and may represent a metadata symbol of the type PTR Color. In particular, the upper 6 bits of the binary representation 500 may represent the metadata symbol PTR BLUE, whereas the upper 6 bits of the binary representation 510 may represent the metadata symbol PTR YELLOW.

As described in connection with the example of FIG. 3B, the metadata label {PTR YELLOW, CEL RED} may be associated with the application memory address 0x1234 before execution of a store instruction that writes content of the data register R1 to the application memory address 0x1234. As a result of the store instruction, a metadata update may be performed, replacing the metadata symbol PTR YELLOW with the metadata symbol PTR BLUE (which is associated with the data register R1).

Accordingly, in some embodiments, the illustrative output function block 405 in the examples of FIGS. 4A-B may be configured to perform a metadata update by extracting the upper 6 bits of the binary representation 500 (which may represent the metadata symbol PTR BLUE), and propagating those bits to the metadata memory address corresponding to the application memory address 0x1234.

Figure 5B:
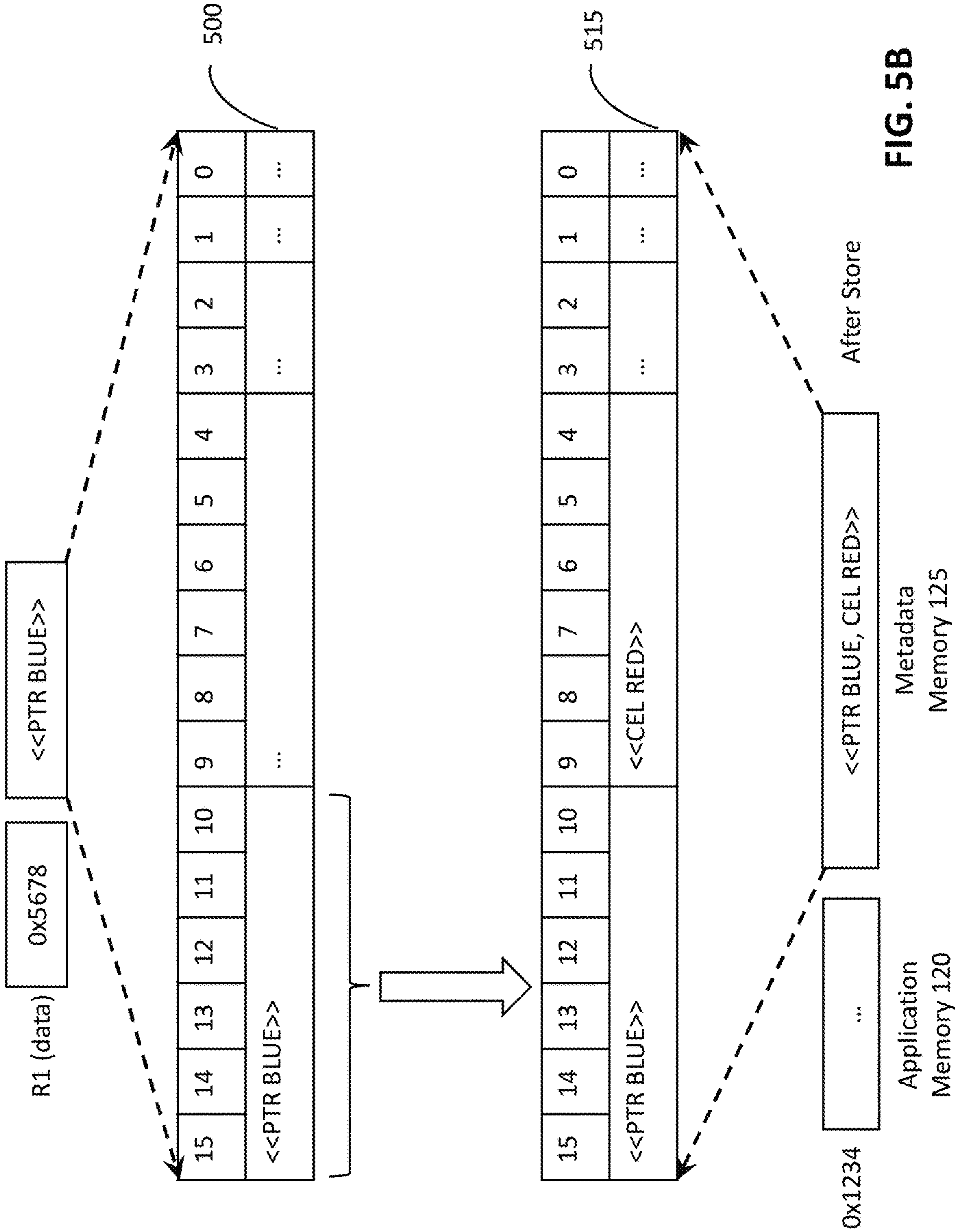
FIG. 5B shows an illustrative binary representation 515, in accordance with some embodiments.

Thus, following the metadata update, the metadata memory address corresponding to the application memory address 0x1234 may store an illustrative binary representation 515, which is shown in FIG. 5B. The upper 6 bits of the binary representation 515 may represent the metadata symbol PTR BLUE. The remainder of the binary representation 515 may be identical to that of binary representation 510.

Although details of implementation are described above in connection with the examples of FIGS. 4A-B and 5A-B, it should be appreciated that aspects of the present disclosure are not limited to any particular manner of implementation. For instance, aspects of the present disclosure are not limited to any particular update semantics. In some embodiments, multiple output computation blocks may be provided, corresponding, respectively, to different update semantics.

Figure 5C:
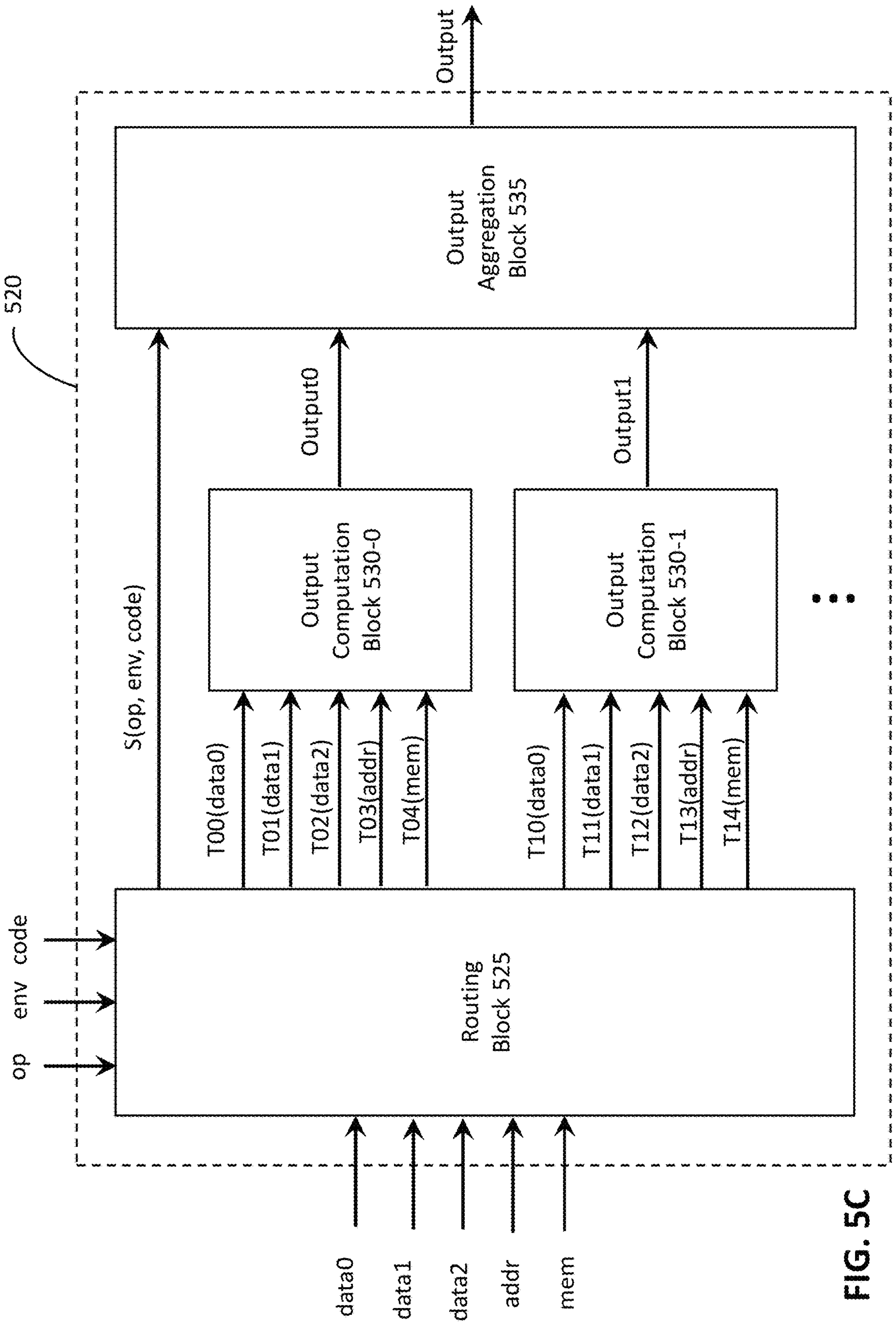
FIGS. 5C-E show an illustrative hardware block 525, in accordance with some embodiments.

FIG. 5C shows an illustrative hardware block 520, in accordance with some embodiments. For instance, the hardware block 520 may be part of the illustrative output function block 405 in the examples of FIGS. 4A-B.

In the example of FIG. 5C, the hardware block 520 includes a routing block 525, output computation blocks 530-0, 530-1, . . . , and an output aggregation block 535. The routing block 525 may have eight input slots, which may be similar to the illustrative input slots described in connection with the examples of FIGS. 4A-B, except there may be three input slots associated with data registers used by an instruction being checked, instead of just one such input slot. For instance, an arithmetic instruction may have two operands that are held, respectively, in two data registers, and there may be a third data register for holding a result of the instruction. Accordingly, there may be input slots [data0] and [data1] corresponding, respectively, to the data registers holding the operands, and an input slot [data2] corresponding to the data register holding the result.

For instance, metadata labels received via the input slots [data0] and [data1] may indicate, respectively, whether the two operands of the arithmetic instruction contain private information. Such metadata labels may be used to determine a metadata label for an output slot [data2'] (e.g., part of Output in FIG. 5C) indicating whether the result contains private information.

Additionally, or alternatively, a metadata label received via the input slots [data2] may be used to determine whether the arithmetic instructions is allowed to write to the data register for holding the result. As an example, the metadata label received via the input slots [data2] may indicate the data register for holding the result may not be modified until current content of the data register is written to memory via a store instruction (as a result of which the metadata label prohibiting modification may be removed).

It should be appreciated that aspects of the present disclosure are not limited to checking an instruction of any particular type, or to having a meaningful metadata label in every input slot. For instance, an arithmetic instruction may not involve any memory access, and therefore the input slots [addr] and [mem] may each receive a default metadata label indicating the slot is empty for the arithmetic instruction.

Additionally, or alternatively, a store instruction may use only one data register to hold data to be stored to memory, and therefore the input slots [data1] and [data2] may each receive a default metadata label indicating the slot is empty for the store instruction.

Additionally, or alternatively, a load instruction may use only one data register to hold data loaded from memory, and therefore the input slots [data0] and [data1] may each receive a default metadata label indicating the slot is empty for the load instruction.

Additionally, or alternatively, an increment instruction may involve only one data register, which may hold both an operand and a result of the increment instruction, and therefore the input slots [data0] and [data1] may each receive a default metadata label indicating the slot is empty for the increment instruction.

The inventor has recognized and appreciated that many policies may share similar update semantics, and that such update semantics may be readily implemented via hardware logic (e.g., programmable and/or fabricated logic), as opposed to a rule table. Accordingly, in some embodiments, the output computation blocks 530-0, 530-1, . . . may implement different update semantics. Given an input metadata pattern, the routing block 525 may determine which one or more of the output computation blocks 530-0, 530-1, . . . should be invoked to provide a metadata update.

Additionally, or alternatively, the routing block 525 may process input binary representations to obtain intermediate binary representations, and may provide the intermediate binary representations as input to one or more of the output computation blocks 530-0, 530-1, . . . .

As an example, the routing block 525 may extract the upper 6 bits of a binary representation from the input slot [data0], which may correspond to the illustrative data register R1 in the examples of FIGS. 5A-B. This may be done in any suitable manner, for instance, by applying a suitable mask (e.g., bitwise-AND with 1111 1100 0000 0000, assuming a 16-bit binary representation) to the binary representation from the input slot [data0]. The result (denoted T00 (data0) in FIG. 5C) may be passed to the output computation block 530-0.

Additionally, or alternatively, the routing block 525 may extract the lower 10 bits of a binary representation from the input slot [mem], which may correspond to the application memory address (e.g., 0x1234) stored in the illustrative address register R0 in the examples of FIGS. 5A-B. This may be done in any suitable manner, for instance, by applying a suitable mask (e.g., bitwise-AND with 0000 0011 1111 1111, assuming a 16-bit binary representation) to the binary representation from the input slot [mem]. The result (denoted T04(mem) in FIG. 5C) may be passed to the output computation block 530-0.

Additionally, or alternatively, the routing block 525 may disable one or more inputs to the output computation block 530-0. For instance, a suitable mask (e.g., bitwise-AND with 0000 0000 0000 0000, assuming a 16-bit binary representation) may be applied to the binary representations from the input slots [data1], [data2], and [addr]. The results (denoted T01(data1), T02(data2), and T03(addr) in FIG. 5C) may indicate to the output computation block 530-0 that the corresponding input slots are disabled.

In some embodiments, the output computation block 530-0 may be configured to process one or more intermediate binary representations received from the routing block 525, and may output a new binary representation Output0. For instance, the output computation block 530-0 may be configured to obtain the new binary representation Output0 by applying a bitwise-OR operation to T00(data0) and T04(mem).

It should be appreciated that aspects of the present disclosure are not limited to implementing the output computation block 530-0 in any particular manner. In some embodiments, the mask T00 may include bitwise-AND with 1111 1100 0000 0000, followed by a right shift of 10 bit positions, so that the extracted bits are located at T00(data0) [5:0]. The output computation block 530-0 may be configured to perform a left shift of 10 bit positions on T00(data0), before applying bitwise-OR with T04(mem). This may provide a concatenation of T00(data0) and T04(mem).

In some embodiments, the routing block 525 may be configured (e.g., by the illustrative loader 215 in the example of FIG. 2, based on an initialization specification) to use one or more binary representations received from the input slots [op], [env], and/or [code] to determine:

i) how to process one or more binary representations received from the input slots [data0], [data1], [data2], [addr], and/or [mem];

ii) which one or more of the output computation blocks 530-0, 530-1, . . . should be invoked; and/or iii) an output slot (e.g., [mem'], [data2'], [env'], etc.) to which a metadata update should be provided.

As an example, a binary representation received from the input slot [op] may include 4 bits (e.g., the lower 4 bits, denoted op[3:0]) indicating an opcode in a selected ISA (e.g., an ISA designated for metadata processing). Such bits may be used by the routing block 525 to determine one or more of the above. As another example, a binary representation received from the input slot [env] may include 2 bits (e.g., the lower 2 bits, denoted env[1:0]) that may be used by the routing block 525 to determine one or more of the above. As another example, a binary representation received from the input slot [code] may include 2 bits (e.g., the lower 2 bits, denoted code[1:0]) that may be used by the routing block 525 to determine one or more of the above.

It should be appreciated that aspects of the present disclosure are not limited to using any particular combination of one or more bits from the input slots [op], [env], and/or [code]. In some embodiments, a combination of one or more bits from the input slots [op], [env], and/or [code] may be selected during initialization (e.g., by the illustrative loader 215 in the example of FIG. 2, based on an initialization specification).

For instance, there may be four different types of store instructions in an ISA designated for metadata processing, but such distinctions may not be relevant for one or more policies being enforced. An encoding may be provided such that bits op[1:0] indicate a store instruction of any type, whereas bits op[3:2] indicate a store instruction of a particular type. Accordingly, only bits op[1:0] may be used by the routing block 525.

In some embodiments, the routing block 525 may use op[3:0], env[1:0], and/or code[1:0] to look up a table, which may return a mask to be applied to one or more binary representations received from the input slots [data0], [data1], [data2], [addr], and/or [mem]. Such a table may be programmed based on one or more policies being enforced (e.g., by the illustrative loader 215 in the example of FIG. 2 based on an initialization specification).

For instance, the routing block 525 may use op[3:0], env[1:0], and/or code[1:0] to look up a first table, which may return the mask T00=1111 1100 0000 0000. The routing block 525 may apply T00 to the binary representation from the input slot [data0], and may pass the result to the output computation block 530-0, as described above.

Additionally, or alternatively, the routing block 525 may use op[3:0], env[1:0], and/or code[1:0] to look up a second table, which may return the mask T04=0000 0011 1111 1111. The routing block 525 may apply T04 to the binary representation from the input slot [mem], and may pass the result to the output computation block 530-0, as described above.

Additionally, or alternatively, the routing block 525 may determine, based on op[3:0], env[1:0], and/or code[1:0], that the input slots [data1], [data2], and [addr] should not be taken into account. Accordingly, the routing block 525 may apply T01=T02=T03=0000 0000 0000 0000 to the binary representations from the input slots [data1], [data2], and [addr]. The results may be passed to the output computation block 530-0, as described above.

Although not shown in FIG. 5C, one or more bits from the input slots [op], [env], and/or [code] (denoted T05(op), T06(code), and/or T07(env)) may be provided to the output computation block 530-0. Such a bit may be incorporated into Output0, and/or otherwise used by the output computation block 530-0 to determine Output0. Additionally, or alternatively, one or more bits from the input slots [op], [env], and/or [code] (denoted T15(op), T16 (code), and/or T17(env)) may be provided to the output computation block 530-1, and may be used to determine Output1.

In some embodiments, the routing block 525 may use op[3:0], env[1:0], and/or code[1:0] to determine which one or more of the output computation blocks 530-0, 530-1, . . . should be invoked. For instance, if op[3:0]==STORE and code[0]==0, the routing block 525 may determine that the output computation block 530-0 should be invoked.

Selective invocation may be implemented in any suitable manner. In some embodiments, the output aggregation block 535 may be provided to combine one or more intermediate outputs (e.g., Output0 from the output computation block 530-0, Output1 from the output computation block 530-1, . . . ). For instance, the output aggregation block 535 may combine the one or more intermediate outputs via bitwise-OR, thereby providing a metadata update (denoted Output in FIG. 5C).

Accordingly, the routing block 525 may invoke the output computation block 530-0 by sending a signal (e.g., S (op, env, code) in the example of FIG. 5C) to the output aggregation block 535 to enable Output0 and/or disable one or more other intermediate outputs (e.g., Output1 from the output computation block 530-1). In response, the output aggregation block 535 may apply a suitable mask (e.g., bitwise-AND with 0000 0000 0000 0000, assuming a 16-bit binary representation) to each intermediate output to be disabled.

The signal S (op, env, code) may be generated in any suitable manner, for example, by using op[3:0], env[1:0], and/or code[1:0] to look up a third table. Additionally, or alternatively, the signal S (op, env, code) may include one or more bits from the input slots [op], [env], and/or [code].

In some embodiments, the output aggregation block 535 may incorporate S (op, env, code) into Output. Additionally, or alternatively, the output aggregation block 535 may use S (op, env, code) to determine how to process an intermediate output (e.g., whether to perform a shift, in which direction, and/or by how many bit position(s)).

As an example, S (op, env, code) may indicate that the lower n bits of Output0 and Output1 are to be concatenated, for some suitable n. Accordingly, the output aggregation block 535 may shifts Output1 [n−1:0] to bit positions [2n−1:n], and may combine the result with Output0[n−1:0] via bitwise-OR.

It should be appreciated that aspects of the present disclosure are not limited to combining intermediate outputs via bitwise-OR, or at all. In some embodiments, the output aggregation block 535 may perform another operation (e.g., add, bitwise-AND, etc.) on one or more selected subsets of bits from one or more intermediate outputs. Such a subset may be selected at run time (e.g., based on the signal S (op, env, code)), or during initialization (e.g., by the illustrative loader 215 in the example of FIG. 2, based on an initialization specification).

It should also be appreciated that aspects of the present disclosure are not limited to having any intermediate output at all. In some instances, an instruction (e.g., a NOP instruction) may have no associated operand metadata labels. As a result, no output computation block may be activated. There may be no output metadata label, or a output metadata label may be determined by the output aggregation block 535 (e.g., based on the signal S (op, env, code)).

In some embodiments, the routing block 525 may use op[3:0], env[1:0], and/or code[1:0] to determine an output slot (e.g., [mem'], [data2'], [env'], etc.) to which a metadata update should be provided. For instance, if op[3:0]==STORE, the routing block 525 may determine that a metadata update should be provided to the output slot [mem'], and may so notify the output aggregation block 535 (e.g., via the signal S (op, env, code)).

It should be appreciated that aspects of the present disclosure are not limited to selecting an output slot in any particular manner, or at all. In some embodiments, the routing block 525 may pass one or more binary representations received from the input slots [op], [env], and/or [code] to the output aggregation block 535 (e.g., via the signal S (op, env, code)), so that the output aggregation block 535 may itself select an output slot. Additionally, or alternatively, a separate instance of the hardware block 520 may be provided for each output slot (e.g., [mem'], [data2'], [env'], etc.).

It should also be appreciated that aspects of the present disclosure are not limited to selecting just one output slot. In some embodiments, metadata updates may be provided to multiple output slots. For instance, metadata updates may be provided for both a source and a target of a data transfer (e.g., according to a stack policy). As an example, an application memory location accessed by a load instruction, and a data register used by the load instruction to hold data loaded from the application memory address, may each have a respective metadata update. Accordingly, a separate instance of the hardware block 520 may be provided for each of the output slots [mem'] and [data2'].

As another example, a data register used by a store instruction to hold data to be stored to an application memory address, and the application memory location itself, may each have a respective metadata update. Accordingly, a separate instance of the hardware block 520 may be provided for each of the output slots [data0'] and [mem'].

It should also be appreciated that aspects of the present disclosure are not limited to any particular number or combination of one or more input slots, or any particular number or combination of one or more output slots. In some embodiments, a slot may be programmable to be an input slot or an output slot.

Figure 5D:
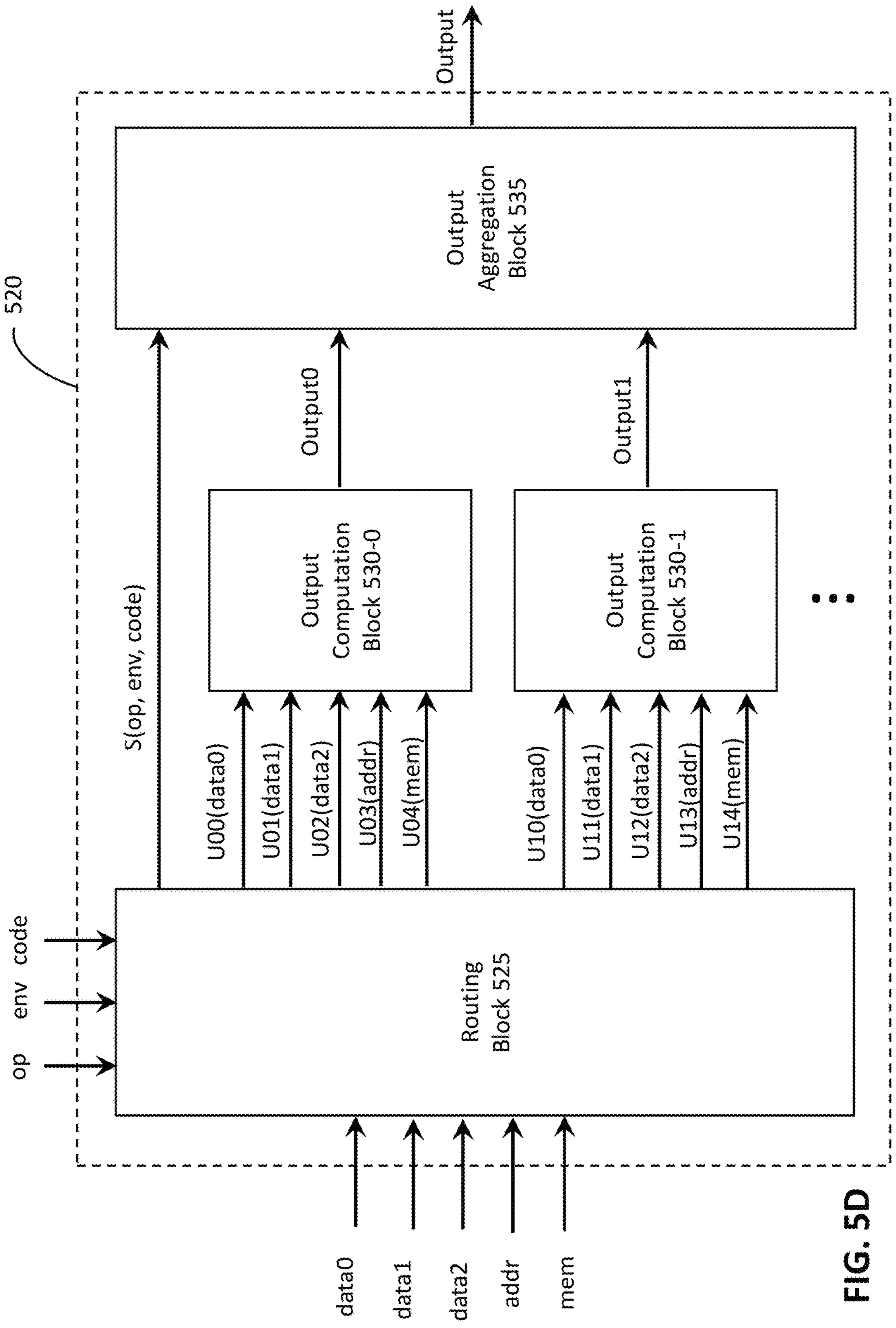

FIG. 5D shows another view of the illustrative hardware block 520 in the example of FIG. 5C, in accordance with some embodiments.

In this example, the routing block 525 invokes multiple output computation blocks, such as the output computation blocks 530-0 and 530-1. This may be done, for instance, in response to determining that op[3:0]==MATH.

The inventor has recognized and appreciated that, if either operand of an arithmetic instruction includes private data according to a privacy policy, then a result of the instruction may also include private data. Accordingly, in some embodiments, the routing block 525 may invoke the output computation block 530-0, which may implement a bitwise-OR operation.

In some embodiments, the routing block 525 may extract a bit (denoted U00(data0) in FIG. 5D) from a first selected position in a binary representation from the input slot [data0], where the first selected position may be designated for the privacy policy. This may be done in any suitable manner, for instance, by applying a first mask (e.g., bitwise-AND with 0000 0000 0000 0001, assuming the lowest bit in a 16-bit binary representation is designated for the privacy policy) to the binary representation from the input slot [data0]. U00(data0) may be a bit indicating whether a first operand of an instruction being checked includes private data.

Additionally, or alternatively, the routing block 525 may extract a bit (denoted U01(data1) in FIG. 5D) from the first selected position in a binary representation from the input slot [data1]. This may be done in any suitable manner, for instance, by applying the first mask to the binary representation from the input slot [data1]. (Thus, U01=U00.) U01 (data1) may be a bit indicating whether a second operand of the instruction includes private data.

The routing block 525 may then pass U00(data0) and U01(data1) to the output computation block 530-0, which may apply a bitwise-OR operation to U00(data0) and U01 (data1), thereby providing Output0.

Additionally, or alternatively, the routing block 525 may disable one or more inputs to the output computation block 530-0. For instance, a suitable mask (e.g., bitwise-AND with 0000 0000 0000 0000, assuming a 16-bit binary representation) may be applied to the binary representations from the input slots [data2], [addr], and [mem]. The results (denoted U02 (data2), U03 (addr), and U04 (mem) in FIG. 5D) may indicate to the output computation block 530-0 that the corresponding input slots are disabled. (Thus, U02=U03=U04=0000 0000 0000 0000.)

The inventor has further recognized and appreciated that a result of the instruction may be trusted only if both operands are trusted according to a security policy. Accordingly, in some embodiments, the routing block 525 may invoke the output computation block 530-1, which may implement a bitwise-AND operation.

In some embodiments, the routing block 525 may extract a bit (denoted U10 (data0) in FIG. 5D) from a second selected position in the binary representation from the input slot [data0], where the second selected position may be designated for the security policy. This may be done in any suitable manner, for instance, by applying a second mask (e.g., bitwise-AND with 0000 0000 0000 0010, assuming the second lowest bit in a 16-bit binary representation is designated for the security policy) to the binary representation from the input slot [data0]. U10 (data0) may be a bit indicating whether the first operand of the instruction being checked includes trusted data.

Additionally, or alternatively, the routing block 525 may extract a bit (denoted U11 (data1) in FIG. 5C) from the second selected position in the binary representation from the input slot [data1]. This may be done in any suitable manner, for instance, by applying the second mask to the binary representation from the input slot [data1]. (Thus, U11=U10.) U11 (data1) may be a bit indicating whether the second operand of the instruction includes trusted data.

The routing block 525 may then pass U10 (data0) and U11 (data1) to the output computation block 530-1, which may apply a bitwise-AND operation to U10 (data0) and U11 (data1), thereby providing Output1.

Additionally, or alternatively, the routing block 525 may disable one or more inputs to the output computation block 530-1. For instance, a suitable mask (e.g., bitwise-AND with 0000 0000 0000 0000, assuming a 16-bit binary representation) may be applied to the binary representations from the input slots [data2], [addr], and [mem]. The results (denoted U12(data2), U13(addr), and U14 (mem) in FIG. 5D) may indicate to the output computation block 530-1 that the corresponding input slots are disabled. (Thus, U12=U13=U14=0000 0000 0000 0000.)

Although not shown in FIG. 5D, the routing block 525 may, in some embodiments, invoke one or more other computation blocks to provide one or more other intermediate outputs. Output0, Output1, and/or the one or more other intermediate outputs may be provided to the output aggregation block 535, which may combine the intermediate outputs (e.g., via bitwise-OR) to provide a metadata update (e.g., Output in the example of FIG. 5D) for a selected output slot (e.g., [data2']).

As described above in connection with the example of FIG. 5C, the routing block 525 may use one or more binary representations received from the input slots [op], [env], and/or [code] to determine how to process one or more binary representations received from the input slots [data0], [data1], [data2], [addr], and/or [mem] (e.g., by looking up the masks U00, U01, . . . , U10, U11, . . . ).

Additionally, or alternatively, the routing block 525 may use one or more binary representations received from the input slots [op], [env], and/or [code] to determine which one or more of the output computation blocks 530-0, 530-1, . . . should be invoked (e.g., 530-0, 530-1, and/or one or more other output computation blocks).

Additionally, or alternatively, the routing block 525 may use one or more binary representations received from the input slots [op], [env], and/or [code] to determine an output slot (e.g., [data2']) to which a metadata update should be provided.

It should be appreciated that aspects of the present disclosure are not limited to implementing an update semantics with bitwise-OR or bitwise-AND. An output computation block may implement any suitable combination of one or more update semantics, such as bitwise-OR, bitwise-AND, bitwise-XOR (e.g., parity function of two or more input bits), bitwise-unique (i.e., one and only one input bit being 1), minimum, maximum, add, subtract, increment, decrement, bitwise-invert (i.e., one's complement), complement (i.e., two's complement), shift, rotate, replace-with-register-value, etc.

As an example, bitwise-unique may be used to determine that an output is likely a pointer if one and only one input is a pointer.

As another example, maximum may be used to assign to an output the highest level of privacy assigned to any input. Additionally, or alternatively, this may be implemented using OR, if there is only one level of privacy, 1 being private and 0 being not private.

As another example, minimum may be used to assign to an output the lowest level of security assigned to any input. Additionally, or alternatively, this may be implemented using AND, if there is only one level of security, 1 being secured (e.g., encrypted) and 0 being not secured (e.g., not encrypted).

In some embodiments, a suitable combination of one or more update semantics may be selected based on one or more policies to be enforced, and the selected combination may be fabricated into silicon, programmed via a bitstream, and/or configured during initialization (e.g., by the illustrative loader 215 in the example of FIG. 2, based on an initialization specification).

Figure 5E:
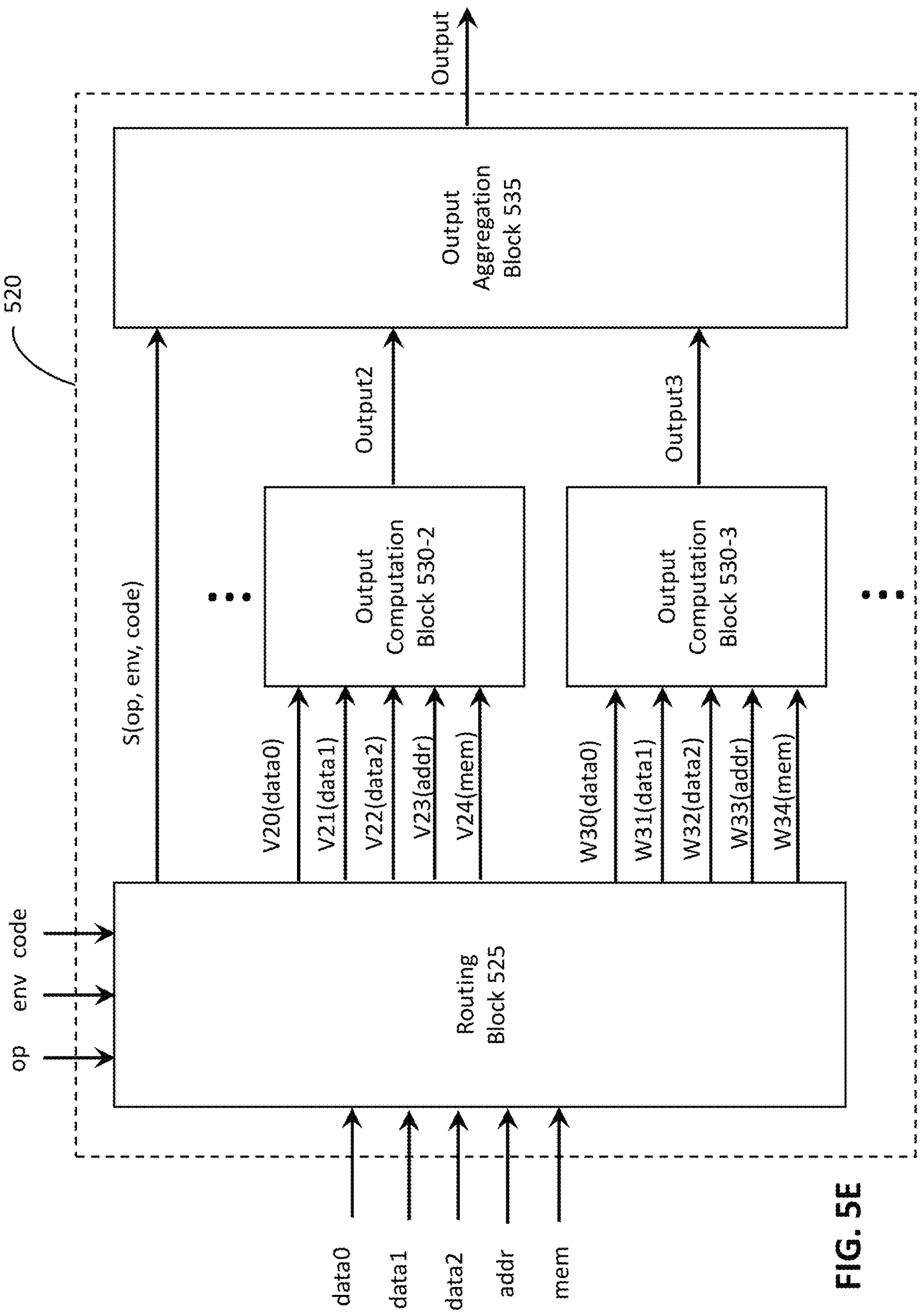

FIG. 5E shows another view of the illustrative hardware block 520 in the example of FIG. 5C, in accordance with some embodiments.

In this example, the routing block 525 invokes the output computation block 530-2, in addition to, or instead of, the output computation blocks 530-0 and/or 530-1 in the example of FIGS. 5C-D.

The inventor has recognized and appreciated that, if both operands of an instruction are pointers according to a memory protection policy, then a result of the instruction is likely not a pointer. For instance, an offset between two pointers may be computed by subtracting one of the pointers from the other, resulting in a value that is not a pointer. Accordingly, in some embodiments, the output computation block 530-2 may output 1 if exactly one input is 1, and may output 0 otherwise (e.g., no input is 1, or multiple inputs are 1). If there are only two inputs, this may be implemented via bitwise-XOR.

In some embodiments, the routing block 525 may extract a bit (denoted V20(data0) in FIG. 5E) from a third selected position in a binary representation from the input slot [data0], where the third selected position may be designated for the memory protection policy. This may be done in any suitable manner, for instance, by applying a third mask (e.g., bitwise-AND with 0000 0000 0000 0100, assuming the third lowest bit in a 16-bit binary representation is designated for the memory protection policy) to the binary representation from the input slot [data0]. V20(data0) may be a bit indicating whether a first operand of an instruction being checked is a pointer.

Additionally, or alternatively, the routing block 525 may extract a bit (denoted V21(data1) in FIG. 5E) from the third selected position in a binary representation from the input slot [data1]. This may be done in any suitable manner, for instance, by applying the third mask to the binary representation from the input slot [data1]. (Thus, V21=V20.) V21(data1) may be a bit indicating whether a second operand of the instruction is a pointer.

The routing block 525 may then pass V20(data0) and V21(data1) to the output computation block 530-2, which may apply a bitwise-XOR operation to V20(data0) and V21(data1), thereby providing Output2.

Additionally, or alternatively, the routing block 525 may disable one or more inputs to the output computation block 530-2. For instance, a suitable mask (e.g., bitwise-AND with 0000 0000 0000 0000, assuming a 16-bit binary representation) may be applied to the binary representations from the input slots [data2], [addr], and [mem]. The results (denoted V22(data2), V23(addr), and V24 (mem) in FIG. 5E) may indicate to the output computation block 530-2 that the corresponding input slots are disabled. (Thus, V22=V23=V24=0000 0000 0000 0000.)

It should be appreciated that aspects of the present disclosure are not limited to instructions that operate on pointers and produce a non-pointer value. In some instances, both operands of an instruction may be pointers, and a result of the instruction may again be a pointer. For example, a math or logical operation may be performed on two pointers to produce a third pointer (e.g., a result of modifying one of the two pointers in view of the other).

Moreover, aspects of the present disclosure are not limited to instructions that produce a pointer only if at least one operand is a pointer. In some instances, an operation may create a new pointer, even though there is no pointer as an operand.

Accordingly, in some embodiments, a binary representation received from the input slot [code] may include one or more bits that indicate: (i) a result of an instruction being checked is known to be a pointer, (ii) the result is known not to be a pointer, or (iii) it is not known whether the result is a pointer or not.

In some embodiments, if the one or more bits indicate it is not known whether the result is a pointer or not, the routing block 525 may apply the masks V20 and V21, as described above.

Additionally, or alternatively, if the one or more bits indicate the result is known to be a pointer, the routing block 525 may replace V20 and V21 so that Output2 will indicate the result is a pointer. For instance, V20 may be replaced with bitwise-AND with 0000 0000 0000 0000, and V21 may be replaced with bitwise-OR with 1111 1111 1111 1111, or vice versa.

Additionally, or alternatively, if the one or more bits indicate the result is known not to be a pointer, the routing block 525 may replace V20 and V21 so that Output2 will indicate the result is not a pointer. For instance, V20 and V21 may both be replaced with bitwise-AND with 0000 0000 0000 0000, or both be replaced with bitwise-OR with 1111 1111 1111 1111.

Referring again to the example of FIG. 5E, the routing block 525 may invoke the output computation block 530-3, in addition to, or instead of, the output computation blocks 530-0 and/or 530-1 in the example of FIG. 5C, and/or the output computation block 530-2.

In some embodiments, a binary representation received from the input slot [code] may include one or more bits designated for an access control policy (e.g., the illustrative access control policy described above in connection with the example of FIGS. 3A-B). For instance, the lowest bit (denoted code[0]) may indicate whether an instruction being checked is associating a Pointer type with a non-pointer value (thereby creating a new pointer). Additionally, or alternatively, the second lowest bit (denoted code[1]) may indicate whether the instruction being checked is removing a Pointer type from an existing pointer (thereby destroying the pointer).

In some embodiments, the access control policy, when enforced by the illustrative tag processing hardware 140 in the example of FIG. 1, may cause the tag processing hardware 140 to associate a different color with each newly created pointer. Thus, each time a pointer is created, the tag processing hardware 140 may generate a new color.

New colors may be generated in any suitable manner. For instance, referring to the example of FIG. 1, a location in the illustrative application memory 120 in the example of FIG. 1 may be designated for use in generating new colors. This location may be associated (e.g., via the illustrative tag map table 142) with a location in the illustrative metadata memory 125.

In some embodiments, the associated location in the metadata memory 125 may be initialized (e.g., by the illustrative loader 215 in the example of FIG. 2, based on an initialization specification) with a binary representation indicating an initial color. For instance, the upper 6 bits of the binary representation may be 000000. When a pointer is created, a load instruction may be performed (e.g., as part of a memory allocation function) that loads a value from the designated location in the application memory 120 into a data register. As a result, the binary representation stored in the associated location in the metadata memory 125 may be loaded into a tag register (e.g., in the illustrative tag register file 146) associated with the data register.

A store instruction may then be performed (e.g., as part of the memory allocation function) that stores the value that has just been loaded into the data register back to the designated location in the application memory 120. A metadata label associated with this store instruction may indicate the store instruction is creating a new pointer. For instance, a binary representation of the metadata label may have the lowest bit set to 1. This may trigger a metadata update to increment to a new color.

For instance, if op[3:0]==STORE and code[0]==0, the routing block 525 may invoke the output computation block 530-0, as described above in connection with the example of FIG. 5C.

If, however, op[3:0]==STORE and code[0]==1, the routing block 525 may invoke the output computation block 530-3 in the example of FIG. 5E. The output computation block 530-3 may be similar to the output computation block 530-0, except the output computation block 530-3 may increment W30(data0) (e.g., by applying an add operation), and then apply a bitwise-OR operation to W34(mem) and a result of incrementing W30(data0). The input W30(data0) may represent a current color, and the result of incrementing W30(data0) may represent the new color.

It should be appreciated that aspects of the present disclosure are not limited to generating a new color by invoking the output computation block 530-3 to increment a current color. In some embodiments, the output computation block 530-3 may access a next available color from a selected location. For instance, the output computation block 530-3 may perform a replace-with-register-value operation to access a next available color from a selected tag register in the illustrative tag register file 146 in the example of FIG. 1.

It should also be appreciated that aspects of the present disclosure are not limited to using the output computation block 530-3 to generate a new color. In some embodiments, if op[3:0]==STORE and code[0]==1, the routing block 525 may access a next available color from the selected tag register in the tag register file 146, as described above. Additionally, or alternatively, the routing block 525 may invoke the output computation block 530-0 as described above in connection with the example of FIG. 5C, except T00 (data0) may be replaced with the next available color.

In some embodiments, in response to the output computation block 530-3 or the routing block 525 accessing the next available color, the tag processing hardware 140 may update the selected location with a new color.

The tag processing hardware 140 may determine the new color in any suitable manner. For instance, the tag processing hardware 140 may increment the next available color by a selected amount. If a selected maximum is reached, a result of the incrementing may wrap around to a selected minimum. The amount of each increment, the maximum, and/or the minimum may be configured during initialization (e.g., by the illustrative loader 215 in the example of FIG. 2, based on an initialization specification).

Additionally, or alternatively, the tag processing hardware 140 may assert an interrupt (e.g., to the illustrative host processor 110 or the illustrative policy processor 150 in the example of FIG. 1) to request that the selected location be updated with a new color. Additionally, or alternatively, the tag processing hardware 140 may mark the selected location as being not usable. Upon receiving confirmation from the policy processor 150 that the selected location has been updated with a new color, the tag processing hardware 140 may mark the selected location as being usable again.

It should also be appreciated that aspects of the present disclosure are not limited to using the output computation block 530-3 in any particular manner, or at all. In some embodiments, the output computation block 530-3 may be used to enforce a multi-level security (MLS) policy. For instance, the MLS policy may have security levels such as PUBLIC, CLASSIFIED, SECRET, TOP-SECRET, etc. A suitable mask X30 (not shown in FIG. 5E) may be applied to a binary representation received from the input slot [data0] to extract one or more bits representing a security level. A complementary mask, denoted X34 (not shown in FIG. 5E), may be applied to a binary representation received from the input slot [mem].

In some embodiments, a binary representation received from the input slot [code] may include one or more bits designated for the MLS policy. The routing block 525 may pass the one or more bits to the output computation block 530-3 (e.g., via an auxiliary input not shown in FIG. 5E). The one or more bits may indicate that the security level should be increased, and/or by what amount. Accordingly, the output computation block 530-3 may increment X30 (data0) by the indicated amount (e.g., by applying an add operation), and then apply a bitwise-OR operation to X34 (mem) and a result of incrementing X30(data0).

Additionally, or alternatively, the one or more bits may indicate that the security level should be decreased, and/or by what amount. Accordingly, the output computation block 530-3 may decrement X30(data0) by the indicated amount (e.g., by applying a subtract operation), and then apply a bitwise-OR operation to X34(mem) and a result of decrementing X30(data0).

Although details of implementation are described above in connection with the examples of FIGS. 5C-E, it should be appreciated that aspects of the present disclosure are not limited to any particular manner of implementation. For instance, aspects of the present disclosure are not limited to implementing the routing block 525, any of the output computation blocks 530-0, 530-1, 530-2, 530-3, . . . , or the output aggregation block 535 in any particular manner, or at all.

In some embodiments, the routing block 525 may provide an auxiliary input (not shown in FIGS. 5C-E) to an output computation block 530-*i*, for some i=0, 1, 2, 3, . . . . The auxiliary input may be determined based on one or more binary representations received from the input slots [op], [env], and/or [code], and may instruct the output computation block 530-*i* how to process one or more intermediate binary representations received from the routing block 525 (e.g., whether to perform a shift, in which direction, and/or by how many bit position(s)).

Additionally, or alternatively, an output computation block 530-*i*, for some i=0, 1, 2, 3, . . . may itself receive one or more binary representations received from the input slots [op], [env], and/or [code], and may use such input(s) to determine how to process one or more intermediate binary representations received from the routing block 525.

Furthermore, aspects of the present disclosure are not limited to having output computation blocks that each implement a respective update semantics. In some embodiments, an output computation block may be provided that is configurable to implement different update semantics (e.g., bitwise-OR, bitwise-AND, bitwise-XOR, add, subtract, etc.).

For instance, in the examples of FIGS. 5D-E, the output computation blocks 530-0, 530-1, 530-2, and 530-3 may be different instances of the same hardware logic (e.g., programmable and/or fabricated logic). The routing block 525 may provide a first auxiliary input (not shown in FIG. 5D) to instruct the output computation block 530-0 to apply a bitwise-OR operation to U00(data0) and U01(data1). Additionally, or alternatively, the routing block 525 may provide a second auxiliary input (not shown in FIG. 5D) to instruct the output computation block 530-1 to apply a bitwise-AND operation to U10 (data0) and U11 (data1).

Additionally, or alternatively, the routing block 525 may provide a third auxiliary input (not shown in FIG. 5E) to instruct the output computation block 530-2 to apply a bitwise-XOR operation to V20(data0) and V21(data1). Additionally, or alternatively, the routing block 525 may provide a fourth auxiliary input (not shown in FIG. 5E) to instruct the output computation block 530-3 to apply an add (or subtract) operation to W30(data0), and/or to apply a bitwise-OR operation to W34(mem) and a result of incrementing (or decrementing) W30(data0).

As described above, the tag processing hardware 140 in the example of FIG. 1 may, in some embodiments, include a policy check function implemented in hardware (e.g., via programmable or fabricated logic, or otherwise at hardware speed). Such a policy check function may be applied to an input pattern constructed based on an instruction to be checked to determine if the instruction should be allowed. In some embodiments, if the instruction is to be allowed, the policy check function may provide an output pattern.

Thus, a policy check function may be used instead of, or in addition to, the illustrative policy processor 150 and/or the illustrative policy table 144 in the example of FIG. 1.

As described above in connection with the example of FIG. 1, the rule table 144 may be implemented using a hash function and a selected memory, such as an on-chip RAM. For instance, a rule entry may include an input pattern in binary form (e.g., with one or more respective binary representations substituted for one or more input metadata labels). Additionally, or alternatively, the rule entry may include an output pattern in binary form (e.g., with one or more respective binary representations substituted for one or more output metadata labels). A hash function may be applied to the input pattern in binary form to generate an address in the selected memory. The rule entry may be stored at that address in the selected memory.

The inventor has recognized and appreciated that a rule collision may occur in such an implementation. For instance, a rule entry having a first input pattern may be installed into the rule table 144. Subsequently, the rule table 144 may be queried with a second input pattern, which may be different from the first input pattern, but may hash to the same address. The rule table 144 may retrieve the rule entry from the selected memory, only to determine that the second input pattern does not match the first input pattern stored in the retrieved rule entry. Thus, the retrieved rule entry may be inapplicable, and the illustrative policy processor 150 in the example of FIG. 1 may be queried with the second input pattern.

The inventor has recognized and appreciated that rule collisions may result in a performance degradation, especially if multiple collisions happen in close succession. For example, two concrete rules that are triggered frequently may happen to have input patterns that hash to the same address. This may cause thrashing, where the two rules may alternately cause each other to be evicted from the rule table 144, even if other addresses in the rule table 144 may still be available to store concrete rules.

Moreover, the inventor has recognized and appreciated that implementing a rule table in hardware may be costly in terms of chip area. For instance, an input pattern may be stored for each concrete rule installed into the rule table, which may use a significant amount of RAM. As a result, more chip area may be used to provide the RAM.

Accordingly, in some embodiments, techniques are provided for determining, based on an input pattern in binary form, whether an instruction giving rise to the input pattern is allowed, without using a rule table.

The inventor has recognized and appreciated that a rule table may be viewed as a hardware implementation of a function that maps input patterns in binary form to one or more results, such as the following: (i) the instruction is disallowed without any error message, (ii) the instruction is disallowed with one or more error messages, (iii) the instruction is allowed without any output metadata label, and/or (iv) the instruction is allowed with one or more output metadata labels. Such a function may be referred to herein as a "policy check function."

Indeed, a rule table may implement a policy check function by storing input patterns and corresponding results as ordered pairs (both in binary form), so that an application of the policy check function may involve looking up an input pattern in the set of ordered pairs stored in the rule table.

The inventor has recognized and appreciated that such a storage-and-lookup approach may be inefficient in terms of power consumption, performance, and/or chip area. For example, consider the function $f(x)=2*x$. This function may be implemented in hardware by storing the following ordered pairs in a cache (where all values are in binary form).

| Input x | Output f(x) = 2*x |
|---|---|
| 0 | 0 |
| 1 | 10 |
| 10 | 100 |
| 11 | 110 |
| 100 | 1000 |
| Etc. | Etc. |

In some implementations, each cache lookup may involve computing a hash of an input value x, using the hash to locate an entry in a cache memory, and determining if the input value x matches the located entry. That may lead to increased power consumption and/or decreased performance. Moreover, if a number of possible input values is large, a significant amount of chip area may be used to store all possible ordered pairs. To reduce chip area, only some (but not all) possible ordered pairs may be stored in the cache. However, as a result, a miss may occur, namely, looking up an input value x that is not present in the cache. In response, a software function may be invoked to compute f(x). That may also lead to increased power consumption and/or decreased performance (e.g., due to overhead involved for exception processing, context switching, etc.).

By contrast, it may be much more efficient to implement the function $f(x)=2*x$ in hardware, for example, with programmable or fabricated logic configured to compute f(x) (e.g., by performing a left shift on an input value x, with or without handling any most significant bit being shifted off). In this manner, no cache lookup (and hence no hashing) may be performed, which may decrease power consumption and/or increase performance. Furthermore, ordered pairs are no longer stored, and therefore chip area may be significantly reduced. Further still, miss processing may not be performed, which may also decrease power consumption and/or increase performance.

Thus, the inventor has recognized and appreciated that it may be desirable to implement a policy check function in hardware, for example, with programmable or fabricated logic configured to compute a result from an input pattern in binary form. This may allow a rule table to be eliminated, or significantly reduced in size.

However, the inventor has also recognized and appreciated that different policy check functions may arise depending on which one or more policies are being enforced. Therefore, it may be desirable to provide processing hardware that is programmable to compute different policy check functions.

Figure 6A:
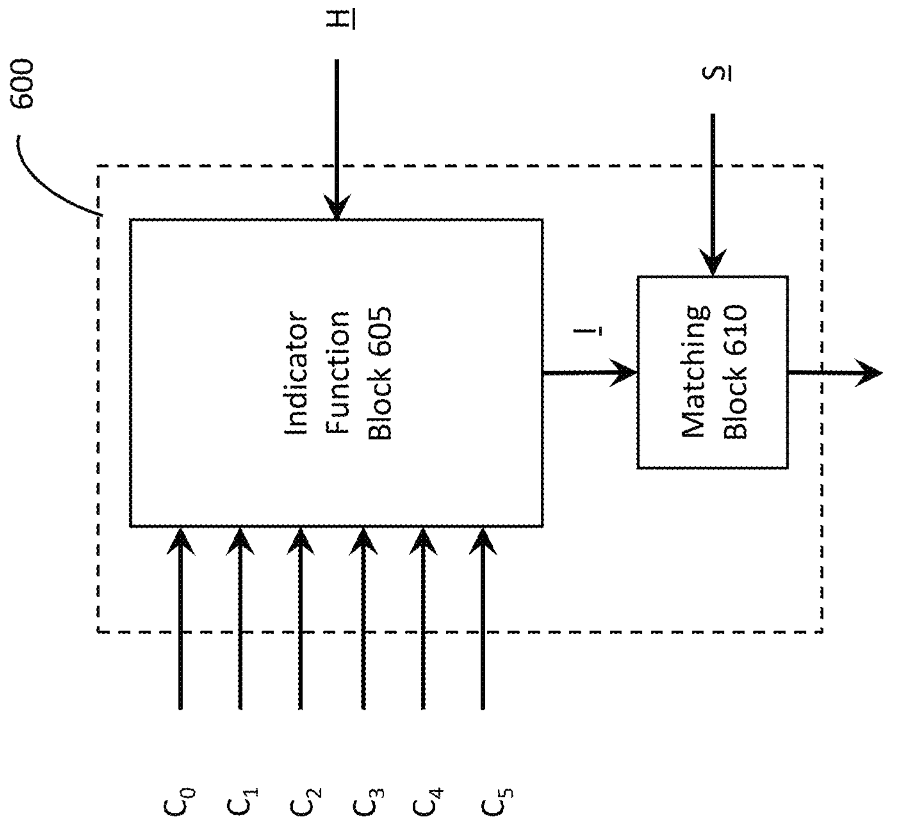
FIG. 6A shows an illustrative hardware block 600 implementing a policy check function, in accordance with some embodiments.

FIG. 6A shows an illustrative hardware block 600 implementing a policy check function, in accordance with some embodiments. In this example, there are six input slots, and there is no output slot. Accordingly, an input pattern may include up to six metadata labels, one for each input slot. A result may include one bit indicating whether an instruction giving rise to the input pattern is allowed.

Thus, the policy check function may map a sextuple of bit strings, $<C_0, \ldots, C_5>$, to a single bit, b. Each bit string $C_i$ ($i=0, \ldots, 5$) may be a binary representation of a metadata label $L_i$ for a corresponding input slot. The bit b may indicate whether an instruction giving rise to the input pattern, $<L_0, \ldots, L_5>$, is allowed.

In the example of FIG. 6A, the hardware block 600 includes an indicator function block 605 and a matching block 610. The indicator function block 605 may be configured to process the input bit strings $C_0, \ldots, C_5$, and output an indicator I. An illustrative implementation of the indicator function block 605 is described below in connection with the example of FIG. 6B.

In some embodiments, the matching block 610 may be configured to determine if the indicator I matches a parameter S. For instance, the matching block 610 may be configured to check if the indicator I equals the parameter S. However, it should be appreciated that aspects of the present disclosure are not limited to checking for equality. For instance, in some embodiments, the matching block 610 may be configured to perform one or more other comparison operations (e.g., greater than or less than) to the indicator I and the parameter S.

In some embodiments, the parameter S may be chosen based on one or more policies being enforced, and may be updated dynamically. By contrast, in some embodiments, the indicator function block 605 and/or the matching block 610 may be used regardless of which one or more policies are being enforced. For instance, the indicator function block 605 may be implemented via programmable or fabricated logic (or otherwise in hardware), and likewise for the matching block 610.

However, it should be appreciated that aspects of the present disclosure are not limited to choosing the parameter S in any particular manner, or having a parameter S at all. In some embodiments, the matching block 610 may have no parameter. For instance, the matching block 610 may be configured to perform one or more unary operations (e.g., a parity check) on an indicator I.

Figure 6B:
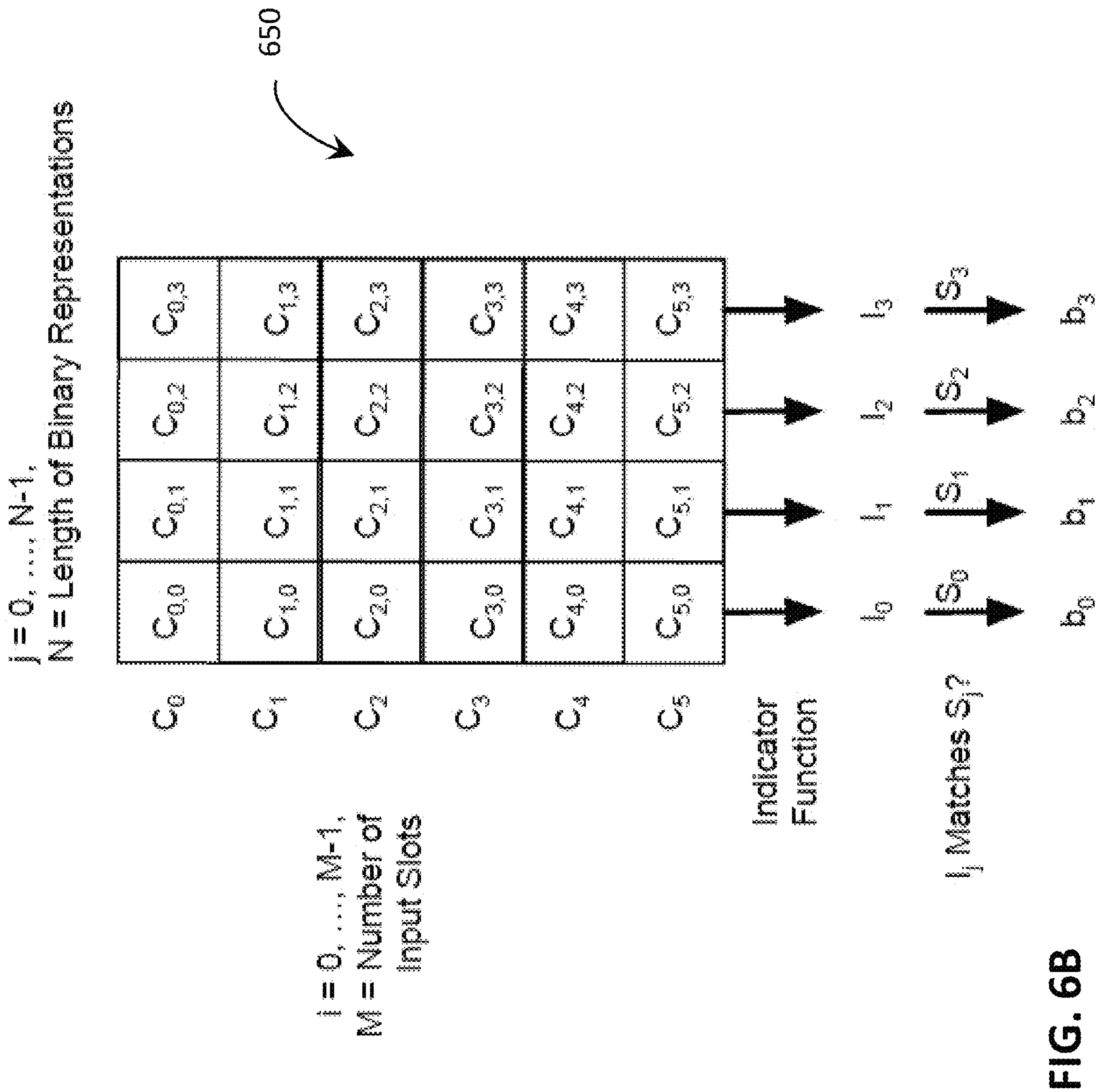
FIG. 6B shows an illustrative array 650 of bits, in accordance with some embodiments.

FIG. 6B shows an illustrative array 650 of bits, in accordance with some embodiments. The array 650 has M rows and N columns, where M is a number of input slot(s), and N is a length of binary representation(s). In this example, there are six input slots (i.e., M=6), and hence there are six rows. These rows may correspond, respectively, to the bit strings $C_0, \ldots, C_5$ in the example of FIG. 6A.

Moreover, in the example of FIG. 6B, each bit string $C_i$ is 4-bit long (i.e., N=4), and hence there are four columns. Such columns may be referred to herein as "bit lanes."

In some embodiments, a policy check function may compute, for each bit lane j in the array 650, an indicator $I_j$. The indicator $I_j$ may be compared against a parameter $S_j$ of the policy check function (e.g., at the illustrative matching block 610 in the example of FIG. 6A). If the indicator $I_j$ matches the corresponding parameter $S_j$ for every j=0, . . . , N−1, then the policy check function may return b=1, indicating that the instruction giving rise to the input pattern, $<L_0, \ldots, L_5>$, is allowed. If the indicator $I_j$ does not match the corresponding parameter $S_j$ for any j=0, . . . , N−1, then the policy check function may return b=0, indicating that the instruction giving rise to the input pattern, $<L_0, \ldots, L_5>$, is disallowed.

Given any bit lane j=0, . . . , N−1, an indicator $I_j$ may have any suitable number of one or more bits, and likewise for a parameter $S_j$. The number of bit(s) in the indicator $I_j$ may be the same as, or different from, the number of bit(s) in the parameter $S_j$.

In some embodiments, an indicator function Ind may be used to compute the indicator $I_j$ for each bit lane j in the array 650. For example, $I_j$ may be computed as $Ind(C_{0,j}: \ldots : C_{5,j})$, where: denotes concatenation of bits to form a bit string. The inventor has recognized and appreciated that, if the indicator function Ind may be readily computed in hardware, then the resulting policy check function may also be readily computed in hardware.

For instance, given a hardware block implementing the indicator function Ind, the resulting policy check function may be implemented by: (i) duplicating the hardware block N times (if N>1), once for each bit lane j; (ii) comparing an indicator output $I_j$ in each bit lane j against the corresponding parameter $S_j$; and (iii) combining resulting bits $b_0, \ldots, b_{N-1}$ with an AND operator.

An indicator output $I_j$ in a bit lane j may be compared against a corresponding parameter $S_j$ in any suitable manner. In some embodiments, $S_j$ may be a bit string of all zero(s). Accordingly, one or more bits of the indicator output $I_j$ may be combined with an OR operator to determine if each of the one or more bits is 0. Additionally, or alternatively, $S_j$ may be a bit string of all one(s). Accordingly, one or more bits of the indicator output $I_j$ may be combined with an AND operator to determine if each of the one or more bits is 1.

Additionally, or alternatively, the parameter $S_j$ may be stored in a first register, and the indicator output $I_j$ may be stored in a second register. An equality test circuit may be used to determine if the contents of these registers are equal.

The inventor has recognized and appreciated that an indicator function Ind may partition the set of bit strings of length M (in this example, M=6) into a plurality of subsets. For instance, given an indicator value S, there may be a subset of zero or more bit strings X of length 6 such that Ind(X)=S.

Accordingly, the indicator function Ind may induce a partition of the set of N-tuples of bit strings of length M (in this example, N=4 and M=6). For instance, given a quadruple $<S_0, \ldots, S_3>$ of indicator values, there may be a subset of quadruples $<X_0, \ldots, X_3>$ of bit strings of length 6 such that $Ind(X_j)=S_j$, for each j=0, . . . , 3. (The function that maps $<X_0, \ldots, X_{N-1}>$ to $<Ind(X_0), \ldots, Ind(X_{N-1})>$ may be written herein as $Ind^N$.)

Furthermore, the inventor has recognized and appreciated that there may be a one-to-one correspondence (e.g., via transposition) between the set of N-tuples of bit strings of length M and the set of M-tuples of bit strings of length N. Therefore, the indicator function Ind may induce a partition of the set of M-tuples of bit strings of length N. For instance, given an N-tuple $S=<S_0, \ldots, S_{N-1}>$ of indicator value(s), there may be a subset of zero or more M-tuples $<C_0, \ldots, C_{M-1}>$ of bit string(s) of length N such that:

$$Ind^N(C_0, \ldots, C_{M-1})=<Ind(C_{0,0}: \ldots : C_{M-1,0}), \ldots, Ind(C_{0,N-1}: \ldots : C_{M-1,N-1})>=<S_0, \ldots, S_{N-1}>.$$

Such a subset may be referred to herein as a "pre-image" of S under the function $Ind^N$. Thus, the policy check function described above, parameterized by S, may simply be a membership check for the pre-image of S under the function $Ind^N$.

However, it should be appreciated that aspects of the present disclosure are not limited to checking that an indicator output $I_j$ matches the corresponding parameter $S_j$ for every bit lane j. In some embodiments, the illustrative matching block 610 in the example of FIG. 6A may compare the indicator output $I_j$ against the corresponding parameter $S_j$ in each bit lane j, and then combine the resulting bits $b_0, \ldots, b_{N-1}$ using any suitable logical circuit, in addition to, or instead of, an AND operator.

For instance, the matching block 610 may be programmable to implement any logical formula F. In that respect, any logical formula F may be written in disjunctive normal form, $F_0 \vee \ldots \vee F_A$, where each $F_a$ may be a conjunction of one or more of the bits $b_0, \ldots, b_{N-1}, \neg b_0, \ldots, \neg b_{N-1}$ (where ¬ denotes negation). The matching block 610 may be programmed to implement the formula F by: (i) for each j, applying an inverter to $b_j$ to obtain $\neg b_j$; (ii) for each $F_a$, applying an AND operator to the corresponding one or more of the bits $b_0, \ldots, b_{N-1}, \neg b_0, \ldots, \neg b_{N-1}$; and (iii) applying an OR operator to $F_0, \ldots, F_A$.

The inventor has recognized and appreciated that a logical formula F may correspond to a subset of M-tuples of bit strings of length N. For instance, for any given bit lane j, $b_j$ may correspond to the preimage of the parameter Sj under the indicator function Ind (or $Ind_j$, if different indicator functions are used for the different bit lanes, as described below), and $\neg b_j$ may correspond to the complement of that preimage. Furthermore, each $F_a$ may correspond to an intersection of one or more such preimages and/or complements thereof, and F may correspond to a union of such intersections.

In this manner, the policy check function may be a membership check for the subset of M-tuples of bit strings of length N corresponding to the logical formula F implemented by the matching block 610. In some embodiments, the logical formula F may be treated as a parameter of the policy check function, although aspects of the present disclosure are not so limited.

Figure 7A:
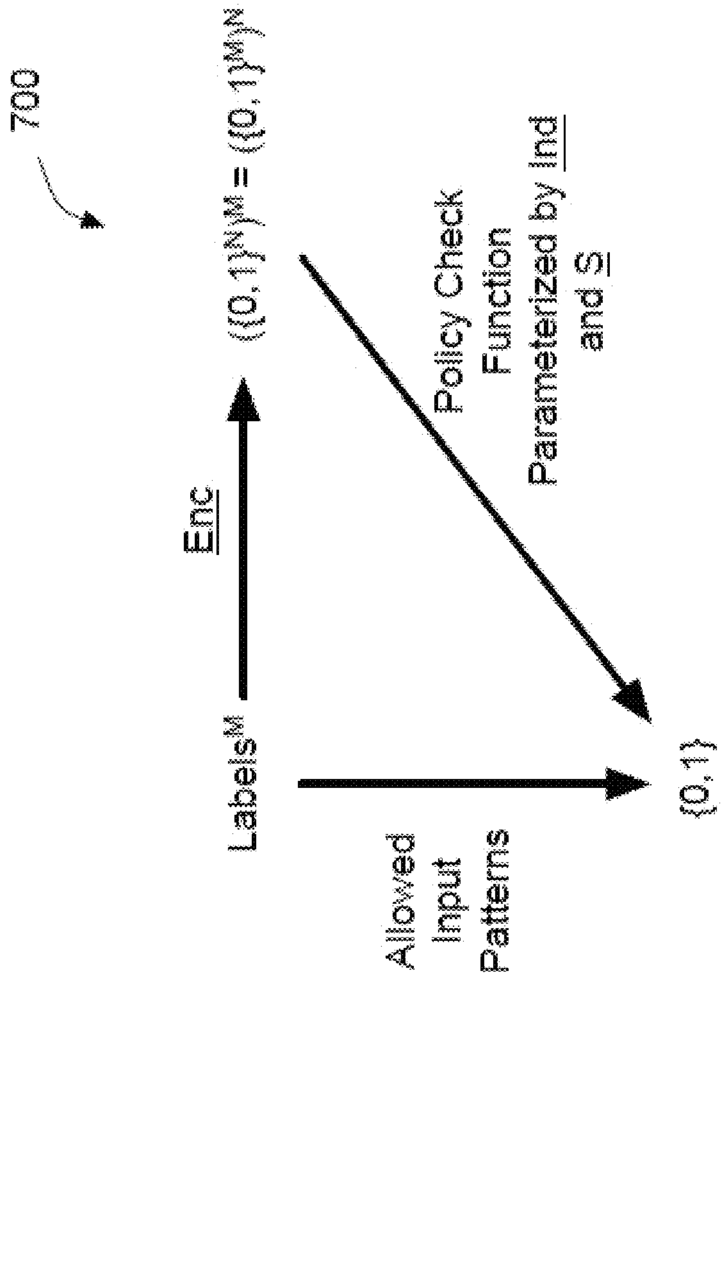
FIG. 7A shows an illustrative arrangement 700 of functions, in accordance with some embodiments.

FIG. 7A shows an illustrative arrangement 700 of functions, in accordance with some embodiments. In this example, Labels denotes a set of metadata labels, and $Labels^M$ denotes a set of input patterns, where each input pattern includes an M-tuple $<L_0, \ldots, L_{M-1}>$ of metadata labels (M>=1). The arrow from $Labels^M$ to {0,1} may denote a function that maps an input pattern to a bit b indicating whether an instruction giving rise to the input pattern is allowed. Such a function may be determined based on one or more policies to be enforced. For instance, one or more input patterns may be identified that are mapped to 1 (indicating allowed).

In the example of FIG. 7A, Enc denotes an encode function that maps a metadata label L to a corresponding binary representation C (e.g., a bit string of length N, N>=1), and Enc denotes a function that maps an M-tuple $<L_0, \ldots, L_{M-1}>$ of metadata label(s) to an M-tuple $<C_0, \ldots, C_{M-1}>$ of corresponding binary representation(s), where $C_i=Enc(L_i)$ (i=0, . . . , M−1). Thus, in this example, $Enc=Enc^M$.

The inventor has recognized and appreciated that, if an encode function Enc may be selected such that all allowed input patterns are mapped by $Enc^M$ into a pre-image of a single N-tuple $S=<S_0, \ldots, S_{N-1}>$ of indicator value(s), then a policy check function parameterized by S may provide correct answers for all binary representations of allowed input patterns. Indeed, given an input pattern <$L_0$, . . . , $L_{M-1}$> that is mapped to 1 (indicating allowed), if the corresponding binary representation(s)<$C_0$, . . . , $C_{M-1}$> is in the pre-image of S, then the policy check function parameterized by S may map <$C_0$, . . . , $C_{M-1}$> to 1 (indicating allowed). This is because, as discussed above, the policy check function parameterized by S may simply be a membership check for the pre-image of S.

Accordingly, in some embodiments, techniques are provided for selecting an encode function Enc and/or an N-tuple S=<$S_0$, . . . , $S_{N-1}$> of indicator value(s) such that all allowed input patterns are mapped by $Enc^M$ into a pre-image of S under a suitable function Ind. For instance, Ind may be $Ind^N$, for some suitable indicator function Ind.

In some embodiments, an indicator I may be a bit string $i_0$: . . . : $i_{V-1}$ of length V for some suitable V>=1. Thus, an indicator function Ind may map a bit string X=$x_0$: . . . : $X_{M-1}$ of length M to a bit string Ind(X)=$i_0$: . . . : $i_{V-1}$ of length V. For instance, Ind(X) may be computed based on the following equation:

$$Ind(X)^T = H X^T,$$

where the superscript T denotes matrix transpose (e.g., flipping a row vector into a column vector, or vice versa), and His an V×M parity check matrix. Thus, in this example, Ind(X) may be a syndrome of X.

In some embodiments, the following parity check matrix H (where V=3 and M=6) may be used.

| | | | | | |
|---|---|---|---|---|---|
| 1 | 1 | 0 | 1 | 0 | 0 |
| 1 | 0 | 1 | 0 | 1 | 0 |
| 0 | 1 | 1 | 0 | 0 | 1 |

The inventor has recognized and appreciated that the indicator function Ind based on the parity check matrix H may be readily computed in hardware. For instance, matrix multiplication may be implemented in hardware by using an AND operator for multiplication and/or an XOR operator for addition. Thus, as discussed above, the resulting policy check function may also be readily computed in hardware.

In some embodiments, the parity check matrix H may be implemented using V register(s) (e.g., in the illustrative indicator function block 605 in the example of FIG. 6B), where each register may store M bit(s) (e.g., V=3 and M=6). Thus, the parity check matrix H may be programmed by modifying the bit string(s) of length M stored in the V register(s), and the corresponding indicator function Ind may be treated as a parameter of the policy check function.

However, it should be appreciated that aspects of the present disclosure are not limited to treating an indicator function as a parameter. For instance, the inventor has recognized and appreciated that setting aside registers for storing a parity check matrix may increase chip area. Accordingly, in some embodiments, a parity check matrix may be selected ahead of time, and may be fixed in hardware (e.g., in programmable or fabricated logic).

Although details of implementation are described above in connection with the examples of FIGS. 6A-B and 7A, it should be appreciated that aspects of the present disclosure are not limited to any particular manner of implementation. For instance, aspects of the present disclosure are not limited to using any particular parity check matrix, or any parity check matrix at all, to compute an indicator.

It should also be appreciated that aspects of the present disclosure are not limited to any particular number N of one or more bits in a binary representation of a metadata label, any particular number M of one or more input slots, or any particular number V of one or more bits in an indicator value.

It should also be appreciated that $Ind^N$ may be viewed as a product Ind where all component(s) $Ind_j$ are identical, and Ind may be viewed as a product Ind with just one component. Each of these may be referred to herein as an indicator function, and may be treated as a parameter of a policy check function.

However, aspects of the present disclosure are not limited to using a common indicator function Ind for all bit lanes j=0, . . . , N−1 (where N>1). In some embodiments, different bit lanes j may have different indicator functions $Ind_j$, and a product of such indicator functions, Ind=<$Ind_0$, . . . , $Ind^N$-1>, may be used. For instance, different matrices Hj may be provided for different bit lanes j=0, . . . , N−1. $Ind_j$(X) may be computed based on the following equation: $Ind_j(X)^T = H_j X^T$.

Furthermore, aspects of the present disclosure are not limited to computing a separate indicator for each bit lane j. In some embodiments, the policy check function may have a parameter S, and an indicator function Ind may map an M-tuple <$C_0$, . . . , $C_{M-1}$> of bit string(s) of length N to an indicator I, which may be compared against the parameter S. The parameter S may be a tuple of one or more values, and likewise for the indicator I. A length of the indicator I may be the same as, or different from, a length of the parameter S.

For instance, an indicator I may be computed by hashing one or more bits from the bit string(s) $C_0$, . . . , $C_{M-1}$ to obtain a hash value, and using the hash value to look up a result bit b from a table. As an example, one or more of bit strings $C_i$ (i=0, . . . , M−1) may be selected, and a substring $C'_i$ may be selected from each of the selected bit string(s) $C_i$. The selected substring(s) $C'_i$ may then be concatenated and/or hashed. The selected substring(s) $C'_i$ may be from the same bit position(s) (e.g., the least significant byte) of the selected bit string(s) $C_i$, or from different bit position(s).

In some embodiments, given a hardware block implementing such an indicator function Ind (e.g., the illustrative indicator function block 605 in the example of FIG. 6A), a resulting policy check function may be implemented simply by adding a comparison circuit (e.g., in the illustrative matching block 610 in the example of FIG. 6A). The comparison circuit may implement an equality check, or some other suitable comparison, between a stored parameter S and an output I of the hardware block implementing the indicator function Ind.

Further still, aspects of the present disclosure are not limited to computing indicators for bit lanes. In some embodiments, one or more indicators may be computed for one or more input slots (e.g., one or more rows in the example of FIG. 6B), in addition to, or instead of, one or more bit lanes (e.g., one or more columns in the example of FIG. 6B).

It should also be appreciated that aspects of the present disclosure are not limited to mapping allowed input patterns into a single pre-image. In some embodiments, a policy check function may check if an input pattern belongs to one of multiple pre-images. For instance, a policy check function may have two parameters S and S' (e.g., S=<$S_0$, . . . , $S_{N-1}$> and S'=<$S'_0$, . . . , $S'_{N-1}$>), and the policy check function may check if an input pattern belongs to a pre-image of S or a pre-image of S'.

It should also be appreciated that $Enc^M$ may be viewed as a product Enc where all component(s) $Enc_i$ are identical, and Enc may be viewed as a product Enc with just one component. Each of these may be referred to herein as an encode function.

However, aspects of the present disclosure are not limited to using a common encode function Enc for all input slots (where M>1). In some embodiments, different input slots i may have different encode functions $Enc_i$, and a product of such encode functions, Enc=<$Enc_0$, . . . , $Enc_{M-1}$>, may be used. For instance, if a metadata label L appears in an input slot i, an encoding of L for the input slot i may be $C_i$=$Enc_i$(L). If the same metadata label L also appears in a different input slot i', an encoding of L for the input slot i' may be $C_{i'}$=$Enc_{i'}$(L). Thus, the metadata label L may have a different encoding depending on an input slot in which the metadata label L appears.

The inventor has recognized and appreciated that having different encode functions for different input slots may increase degrees of freedom, which may in turn increase a likelihood that a suitable set of encodings for metadata labels may be found. However, it should be appreciated that aspects of the present disclosure are not so limited.

Figure 7B:
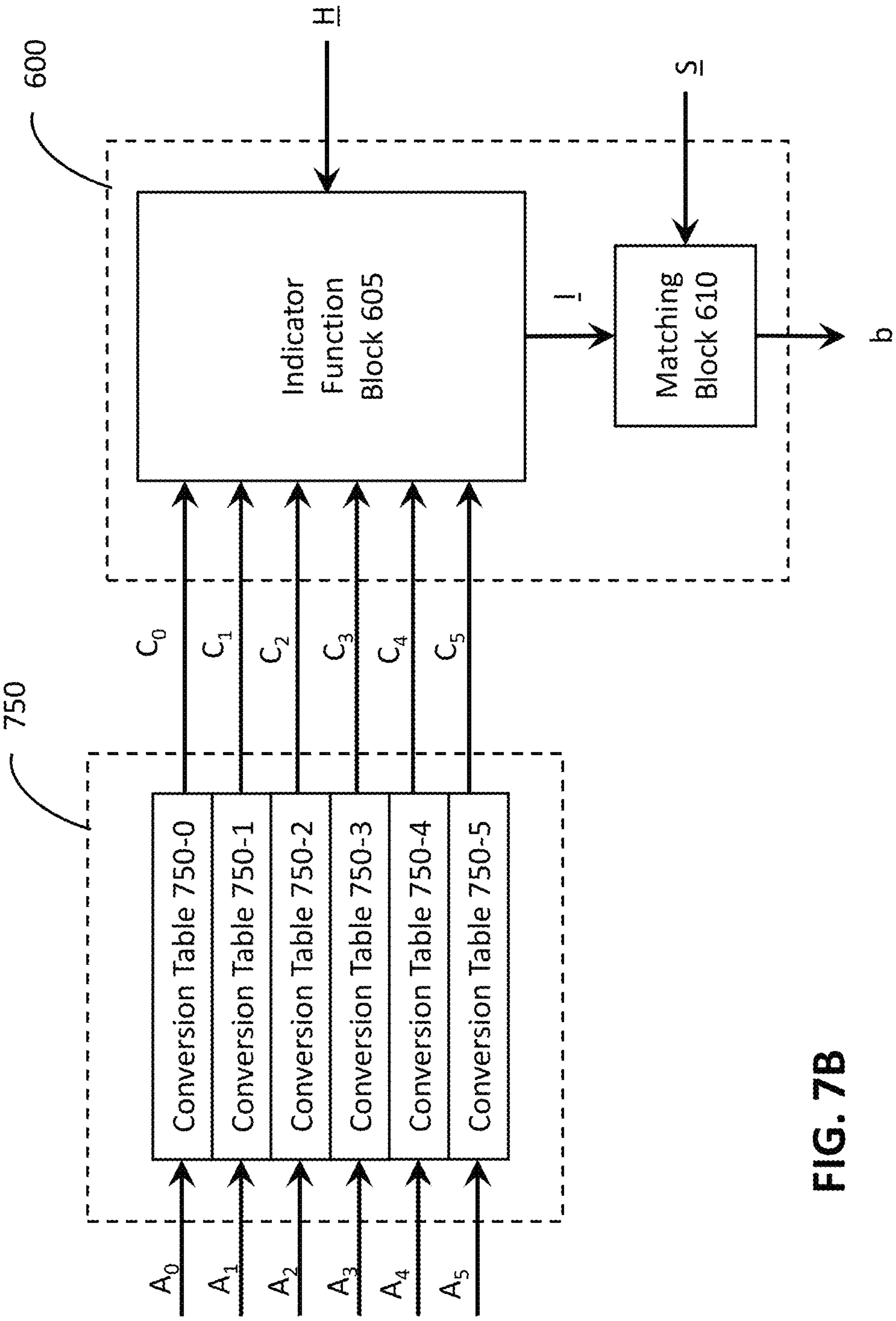
FIG. 7B shows an illustrative conversion block 750, in accordance with some embodiments.

FIG. 7B shows an illustrative conversion block 750, in accordance with some embodiments. For instance, the conversion block 750 may be used to convert an M-tuple <$A_0$, . . . , $A_{M-1}$> of bit string(s) of length N' to an M-tuple <$C_0$, . . . , $C_{M-1}$> of bit string(s) of length N, for some suitable M, N,N'>=1. The input M-tuple <$A_0$, . . . , $A_{M-1}$> may be a result of applying a suitable encode function Enc to an input pattern <$L_0$, . . . , $L_{M-1}$>. For instance, <$A_0$, . . . , $A_{M-1}$>=$Enc^M$<$L_0$, . . . , $L_{M-1}$>=<Enc($L_0$), . . . , Enc($L_{M-1}$)>. The output M-tuple <$C_0$, . . . , $C_{M-1}$> may be provided as input to the illustrative hardware block 600 in the example of FIG. 6A.

In some embodiments, N may be strictly greater than N', so that the conversion block 750 may be an expansion block. In some other embodiments, N may be strictly less than N', so that the conversion block 750 may be a compression block. In some other embodiments, N may be equal to N'.

In some embodiments, the conversion block 750 may include a storage (e.g., an on-chip RAM) having M conversion table(s). For instance, in the example of FIG. 7B, there are six conversion tables 750-0, . . . , 750-5. Given an input slot i, the encoding $A_i$ may be used to look up the conversion table 750-*i* to retrieve a corresponding $C_i$. Therefore, in this example, $Enc_i$ may be Enc followed by a mapping implemented by the conversion table 750-*i*, for each i=0, . . . , M−1.

In an embodiment where N' is strictly smaller than N, the mapping implemented by the table 750-*i* (i=0, . . . , M−1) may be viewed as an expansion function $Exp_i$. Each such expansion function $Exp_i$ may have a corresponding compression function $Comp_i$ that maps a bit string of length N (e.g., $C_i$) to a bit string of length N' (e.g., $A_i$).

It should be appreciated that aspects of the present disclosure are not limited to implementing a conversion table in any particular manner, or at all. In some embodiments, a conversion table 750-*i* may be populated before run time (e.g., at compile time, link time, and/or load time) by applying a corresponding compression function $Comp_i$ to binary representations of length N (e.g., $C_i$) to obtain binary representations of length N' (e.g., $A_i$). A binary representation of length N' may be used as an address from which a corresponding binary representation of length N may be retrieved.

Additionally, or alternatively, a hash function, or some other suitable function implemented in hardware, may be used to map a binary representation of length N' to an address from which a corresponding binary representation of length N may be retrieved.

Additionally, or alternatively, a binary representation of length N' may be used to look up an intermediate value from a conversion table 750-*i*. The intermediate value may in turn be used to compute (e.g., in hardware) a corresponding binary representation of length N.

It should also be appreciated that aspects of the present disclosure are not limited to having multiple conversion tables. In some embodiments, a common conversion table may be used for each i=0, . . . , M−1.

The inventor has recognized and appreciated that a Boolean satisfiability solver may be used to select an encode function Enc and a parameter S such that all allowed input patterns are mapped by Enc into a pre-image of S under some suitable indicator function Ind. For instance, the indicator function Ind may be the illustrative indicator function $Ind^N$ described above in connection with the example of FIG. 7A, based on the illustrative parity check matrix H.

Referring again to the example of FIG. 6B, the Boolean satisfiability solver may, in some embodiments, be used to select a logical formula F, along with the encode function Enc and parameter S, such that all allowed input patterns are mapped by Enc into a union of intersection(s) of pre-image(s) and/or complement(s) thereof of $S_j$ under $Ind_j$ (j=0, . . . , N−1).

Figure 8:
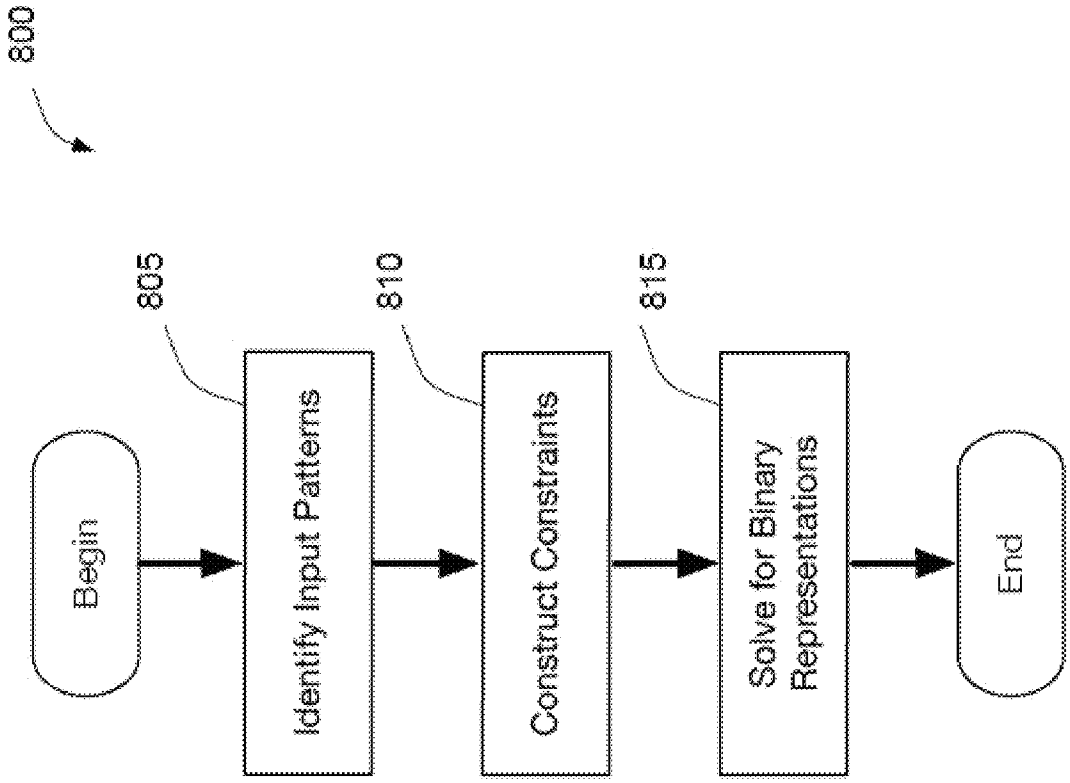
FIG. 8 shows an illustrative process 800 for selecting an encode function and a parameter, in accordance with some embodiments.

FIG. 8 shows an illustrative process 800 for selecting an encode function and a parameter, in accordance with some embodiments. Part or all of the process 800 may be performed at compile time, link time, and/or load time (e.g., by the illustrative policy compiler 220, the illustrative policy linker 225, and/or the illustrative loader 215 in the example of FIG. 2, respectively). Additionally, or alternatively, part or all of the process 800 may be performed at run time by the illustrative tag processing hardware 140 and/or the illustrative policy processor 150 in the example of FIG. 1. For instance, part or all of the process 800 may be performed when one or more policies being enforced are dynamically updated.

At act 805, some or all allowed input patterns may be identified. For instance, one or more input patterns may be identified that trigger one or more symbolic rules in one or more policies to be enforced. Such input patterns may include one or more input patterns corresponding to allowed instructions and/or one or more input patterns corresponding to explicitly disallowed instructions.

The inventor has recognized and appreciated that run time performance may not be of concern for disallowed instructions. Accordingly, in some embodiments, some or all input patterns corresponding to allowed instructions may be identified, whereas input patterns corresponding to explicitly disallowed instructions may not be included.

In some embodiments, all allowed input patterns may be identified, and a count of such input patterns may be obtained.

At act 810, one or more constraints may be constructed. Such a constraint may include a condition involving one or more variables. For instance, each metadata label L that appears in some input pattern identified at act 805 may be associated with M×N Boolean variable(s) $c^L_{i,j}$, where i=0, . . . , M−1, and j=0, . . . , N−1. If the metadata label L appears in input slot 0, then $c^L_{0,0}$, . . . , $c^L_{0,N-1}$ may be used to construct one or more constraints. Likewise, if the metadata label L appears in input slot 1, then $c^{L}_{1,0}, \ldots, c^{L}_{1,N-1}$ may be used to construct one or more constraints, and so on.

Thus, for an input pattern $P=\langle L_0, \ldots, L_{M-1}\rangle$, there may also be M×N Boolean variable(s): $C^{L\_i}_{i,j}$, i=0, . . . , M−1, and j=0, . . . , N−1. For instance, if a metadata label L appears in two different input slots (e.g., i and i'), different Boolean variables may be used (e.g., $c^{L}_{i,0}, \ldots, c^{L}_{i,N-1}$ and $c^{L}_{i',0}, \ldots, c^{L}_{i',N-1}$, respectively).

Additionally, or alternatively, there may be V×N variable(s) $s_{i,j}$, where i=0, . . . , V−1, and j=0, . . . , N−1.

In some embodiments, a constraint may be constructed for each input pattern identified at act 805. As an example, given an input pattern $P=\langle L_0, \ldots, L_{M-1}\rangle$, N constraints may be constructed as follows: for each j=0, . . . , N−1, $$Ind < c_{0,j}^{L\_0}, \ldots , c_{M-1,j}^{L\_M-1} >= < s_{0,j}, \ldots , s_{V-1,j} >,$$

where Ind is a suitable indicator function. Thus, for each j=0, . . . , N−1, the corresponding constraint may provide that an indicator computed from an assignment of the variable(s) $C^{L\_0}_{0,j}, \ldots, C^{L\_M-1}_{M-1,j}$ matches an assignment of the variable(s) $s_{0,j}, \ldots, S_{V-1,j}$.

As described above, in some embodiments, an indicator function Ind may be provided based on a parity check matrix. For instance, for each j=0, . . . , N−1, the j-th constraint may be provided as follows:

$$H < c_{0,j}^{L\_0}, \ldots , c_{M-1,j}^{L\_M-1} >^T = < s_{0,j}, \ldots , s_{V-1,j} >^T,$$

where the superscript T denotes matrix transpose (e.g., flipping a row vector into a column vector, or vice versa), and H is an V×M parity check matrix.

At act 815, a Boolean satisfiability solver may be used to solve for one or more of the Boolean variables subject to one or more of the constraints constructed at act 810. Any suitable Boolean satisfiability solver may be used, including, but not limited to, a satisfiability modulo theories (SMT) solver.

In some embodiments, a solution returned by the Boolean satisfiability solver may include, for each metadata label L that appears in some input pattern identified at act 805, and each i=0, . . . , M−1, an assignment of the variable(s) $c^{L}_{i,0}, \ldots, c^{L}_{i,N-1}$ to truth value(s). A bit string may be obtained by concatenation, and may be used as $Enc_i$ (L) for the metadata label L.

It should be appreciated that aspects of the present disclosure are not limited to having different encode functions $Enc_i$ for different input slots i. In some embodiments, a common encode function Enc may be used for all input slots. Thus, each metadata label L may be associated with N Boolean variable(s) $c^{L}_{0}, \ldots, c^{L}_{N-1}$. For an input pattern $P=\langle L_0, \ldots, L_{M-1}\rangle$, there may be M×N Boolean variable(s): $c^{L\_i}_{j}$, i=0, . . . , M−1, and j=0, . . . , N−1. For each j=0, . . . , N−1, the j-th constraint may be provided as follows:

$$Ind < c_{j}^{L\_0}, \ldots , c_{j}^{L\_M-1} >= < s_{0,j}, \ldots , s_{V-1,j} >.$$

Accordingly, a solution returned by the Boolean satisfiability solver may include an assignment of the variable(s) $c^{L}_{0}, \ldots, c^{L}_{N-1}$ to truth value(s). A bit string may be obtained by concatenation, and may be used as Enc(L) for the metadata label L.

The inventor has recognized and appreciated that, by allowing different encode functions $Enc_i$ for different input slots i, more variables may be introduced (e.g., M×N variables $c^{L}_{i,j}$ for each metadata label L, as opposed to just N variables $c^{L}_{j}$). As a result, less restrictive constraints may be constructed at act 810, and a solution may be found more readily at act 815. However, as discussed above, aspects of the present disclosure are not limited to using different encode functions $Enc_i$ for different input slots i.

In some embodiments, a solution returned by the Boolean satisfiability solver may include, for each j=0, . . . , N−1, an assignment of the variable(s) $s_{0,j}, \ldots, S_{V-1,j}$ to truth value(s). A bit string may be obtained by concatenation, and may be used as $S_j$ of $S=\langle S_0, \ldots, S_{N-1}\rangle$.

It should be appreciated that aspects of the present disclosure are not limited to having a different $S_j$ for each bit lane j=0, . . . , N−1. In some embodiments, there may be only V variable(s) $s_i$, where i=0, . . . , V−1. For each j=0, . . . , N−1, the j-th constraint may be provided as follows:

$$Ind < c_{0,j}^{L\_0}, \ldots , c_{M-1,j}^{L\_M-1} >= < s_0, \ldots , s_{V-1} >.$$

Accordingly, a solution returned by the Boolean satisfiability solver may include an assignment of the variable(s) $s_0, \ldots, s_{V-1}$ to truth value(s). A bit string may be obtained by concatenation, and may be used as the parameter S.

Additionally, or alternatively, there may be 2×V×N variables $s_{i,j}$ and $s'_{i,j}$, where i=0, . . . , V−1, and j=0, . . . , N−1. For each j=0, . . . , N−1, the j-th constraint may be provided as follows:

$$\left(Ind < c_{0,j}^{L\_0}, \ldots , c_{M-1,j}^{L\_M-1} >= < s_0, \ldots , s_{V-1} >\right) \text{ or }$$
$$\left(Ind < c_{0,j}^{L\_0}, \ldots , c_{M-1,j}^{L\_M-1} >= < s_0, \ldots , s_{V-1} >\right).$$

Accordingly, a solution returned by the solver may include, for each j=0, . . . , N−1, an assignment of the variable(s) $s_{0,j}, \ldots, S_{V-1,j}$ to truth value(s), as well as an assignment of the variable(s) $s'_{0,j}, \ldots, s'_{V-1,j}$ to truth value(s). A bit string may be obtained by concatenation from the assignment of $s_{0,j}, \ldots, S_{V-1,j}$, and may be used as $S_j$ of $S=\langle S_0, \ldots, S_{N-1}\rangle$. Likewise, a bit string may be obtained by concatenation from the assignment of $s'_{0,j}, \ldots, s'_{V-1,j}$, and may be used as $S'_j$ of $S'=\langle S'_0, \ldots, S'_{N-1}\rangle$.

The inventor has recognized and appreciated that more variables (e.g., 2×V×N variables $s_{i,j}$ and $s'_{i,j}$, or V×N variables $s_{i,j}$, as opposed to just V variables $s_i$) may result in less restrictive constraints at act 810, so that a solution may be found more readily at act 815. However, it should be appreciated that aspects of the present disclosure are not limited to using any particular number of variables.

For instance, in some embodiments, the process 800 may be repeated with different values of N (i.e., different lengths for binary representations of metadata labels). As an example, a small N (e.g., N=1, 2, 3, 4, 5, . . . ) may be used initially. If the Boolean satisfiability solver is unable to find a solution, N may be increased (e.g., by 1, 2, . . . ). With each such increase, more variables may be introduced, which may result in less restrictive constraints. This may be repeated until the Boolean satisfiability solver is able to find a solution.

Although details of implementation are described above in connection with the example of FIG. 8, it should be appreciated that aspects of the present disclosure are not limited to any particular manner of implementation. For instance, aspects of the present disclosure are not limited to using a Boolean satisfiability solver. In some embodiments, one or more exact and/or approximate optimization techniques may be used. For example, a heuristic technique such as simulated annealing may be used to select an encode function Enc and a parameter S so as to increase one or more scores.

Moreover, aspects of the present disclosure are not limited to using a Boolean satisfiability solver to select both an encode function Enc and a parameter S. In some embodiments, an encode function may be selected in another suitable manner, and a Boolean satisfiability solver may be used to select a parameter S, or vice versa. Additionally, or alternatively, a Boolean satisfiability solver may be used to select an indicator function, for instance, by selecting an V×M matrix $H_j$ for each bit lane j=0, . . . , N−1.

The inventor has recognized and appreciated that, although there may be M input slot(s), an input pattern may be encountered that has fewer than M metadata label(s). For instance, an input slot may be used to present a metadata label associated with a storage location (e.g., a register or a memory location) accessed by an instruction, but not every instruction may access a storage location.

Accordingly, in some embodiments, there may be M×N variable(s) $t_{i,j}$, where i=0, . . . , M−1, and j=0, . . . , N−1. If an input slot i is empty in an input pattern, the variable(s) $t_{i,0}, \ldots, t_{i,N-1}$ may be used in constructing one or more constraints at act 810 in the example of FIG. 8.

Additionally, or alternatively, there may be N variable(s) $t_j$, where j=0, . . . , N−1. If any input slot is empty in an input pattern, the variable(s) $t_0, \ldots, t_{N-1}$ may be used in constructing one or more constraints at act 810 in the example of FIG. 8.

However, it should be appreciated that aspects of the present disclosure are not limited to having variables that represent an empty input slot. In some embodiments, a selected bit string (e.g., a bit string of N zeros) may be used to represent an empty input slot.

As discussed above, the illustrative constraints constructed at act 810 in the example of FIG. 8 may provide that, for each allowed input pattern P=<$L_0, \ldots, L_{M-1}$>, an indicator computed from an assignment of the variable(s) $c^{L\_0}_{0,j}, \ldots, c^{L\_M-1}_{M-1,j}$ matches an assignment of the variable(s) $s_{0,j}, \ldots, s_{V-1,j}$ for bit lane j=0, . . . , N−1. Thus, a policy check function parameterized by Ind and S may provide correct answers for all binary representations of allowed input patterns. That is, given an allowed input pattern P, the policy check function parameterized by Ind and S may map Enc(P) to 1. As a result, the policy check function, when implemented by the illustrative tag processing hardware 140 in the example of FIG. 1, may allow every instruction that should be allowed according to one or more policies being enforced, and therefore may be thought of as a test with no false positive error (i.e., no allowed instruction being incorrectly flagged as a policy violation).

The inventor has recognized and appreciated that it may be desirable to prevent or reduce false negative errors (i.e., failing to flag disallowed instructions as policy violations), in addition to, or instead of, preventing or reducing false positive errors. For instance, it may be desirable to have a policy check function that disallows every instruction that should be disallowed. Stated differently, it may be desirable to have a policy check function that allows only those instructions that should be allowed.

Accordingly, in some embodiments, an evaluation function Eval may be provided based on one or more policies being enforced, such that, given an input pattern P=<$L_0, \ldots, L_{M-1}$>, Eval(P)=1 if and only if an instruction giving rise to the input pattern P is allowed according to the one or more policies.

Accordingly, the following constraint may be provided at act 810 in the example of FIG. 8.

Illustrative Constraint (6.a)

$$\mathrm{Eval}(P)=(\mathrm{Ind}(\mathrm{Enc}(P))=S)$$

Then, at act 815, a Boolean satisfiability solver may be used to select Ind, Enc, and/or S subject to a conjunction of one or more instances of the illustrative constraints (6.a) (e.g., a conjunction over all P in a certain set of input patterns).

However, it should be appreciated that aspects of the present disclosure are not limited to using any particular constraint, or any constraint at all. For instance, as described above in connection with the example of FIG. 6B, the policy check function may be parametrized by a logical formula F, in addition to the indicator function Ind and the parameter S. Accordingly, in some embodiments, the following constraint may be provided at act 810 in the example of FIG. 8.

Illustrative Constraint (6.b)

```
Eval(P) = F(
  (Ind0(bit_lane_0(Enc(P))) = S0),
  ...,
  (IndN-1(bit_lane_N-1(Enc(P))) = SN-1)
  )
```

Then, at act 815, a Boolean satisfiability solver may be used to select Ind, Enc, S, and/or F subject to a conjunction of one or more instances of the illustrative constraints (6.b) (e.g., a conjunction over all P in a certain set of input patterns).

In some embodiments, a type Labels may be provided in an input language of a Boolean satisfiability solver. As an example, Labels may be provided in a recursive manner based on one or more metadata type declarations in a policy language. For instance, Labels may include the empty metadata label { }. Additionally, or alternatively, for every metadata symbol A declared in the policy language, Labels may include a metadata label {A}.

Additionally, or alternatively, given a set $W_1$ of metadata labels for a first policy and a set $W_2$ of metadata labels for a second policy, Labels may include all metadata labels of the form $L_1 \cup L_2$, where $L_1$ is from $X_1$, $L_2$ is from $X_2$, and U denotes set union.

In some embodiments, Labels may only include metadata labels that are either obtained from an initialization specification, or resulting from a rule.

In some embodiments, an evaluation function Eval:Labels$^M$->{0, 1} may be provided in an input language of a Boolean satisfiability solver. For instance, the function Eval may be provided based on one or more policies written in a policy language. As an example, a first policy may have a corresponding evaluation function $\mathrm{Eval}_1$:Labels$^M$->{0, 1}, and a second policy may have a corresponding evaluation function $\mathrm{Eval}_2$:Labels$^M$-> {0, 1}. A combined evaluation function Eval may be provided as follows.

$$\mathrm{Eval}(P)=\mathrm{Eval}_1(P) \text{ and } \mathrm{Eval}_2(P)$$

As another example, a policy may include one or more policy rules $R_0$, $R_1$, . . . . Each policy rule R may be translated into a corresponding evaluation function $Eval_R$, and a combined evaluation function Eval may be provided as follows.

$$Eval(P)=Eval_{R\_0}(P) \text{ or } Eval_{R\_1}(P) \text{ or } \ldots$$

Returning to the example of FIG. 8, a Boolean satisfiability solver may be used, at act 815, to select Ind, Enc, and/or S subject to a conjunction of one or more constraints of the following form.

$$Eval(P)=(Ind(Enc(P))=S)$$

In some embodiments, the conjunction of one or more constraints may be taken over all p in $Labels^M$. However, the inventor has recognized and appreciated that $Labels^M$ may be a large set. As such, if the above constraint is to be satisfied for all p in $Labels^M$, the Boolean satisfiability solver may be less likely to find a solution, or it may take more processor cycles (e.g., more processor cores and/or more time) to do so.

Accordingly, in some embodiments, the conjunction of one or more constraints may be taken over all p in a subset of $Labels^M$ (as opposed to $Labels^M$ in its entirety). For instance, the inventor has recognized and appreciated that a significant number of metadata labels in Labels may not actually appear in any allowed input pattern. Accordingly, in some embodiments, a subset Labels' of Labels may be provided that includes metadata labels appearing in one or more allowed input patterns, such as those identified at act 805 in the example of FIG. 8. The conjunction of one or more constraints may then be taken over all p in $Labels'^M$.

In some embodiments, an indicator function $Ind:((\{0, 1\}^M)^N \to \{0, 1\}^V$ may be provided in an input language of a Boolean satisfiability solver. As an example, the indicator function Ind may be provided as $\langle Ind_0, \ldots, Ind_{N-1}\rangle$, where each $Ind_j$ is provided based on the following equation:

$$Ind_j(X)^T=H_jX^T$$

In some embodiments, $H_j$ may be a variable for some bit lane j, so that a solution found by the Boolean satisfiability solver may include a matrix $H_j$ to be used to implement an indicator function $Ind_j$ for the bit lane j.

In some embodiments, an encode function Enc: $Labels^M \to (\{0,1\}^N)^M$ may be provided in an input language of a Boolean satisfiability solver. As an example, the encode function Enc may be provided as $\langle Enc_0, \ldots, Enc_{M-1}\rangle$, where $Enc_i$: Labels-> $\{0, 1\}^N$ may be a variable for some input slot i. Thus, a solution found by the Boolean satisfiability solver may include an encode function $Enc_i$ for the input slot i.

In some embodiments, a parameter s: $(\{0, 1\}^V)^N$ may be provided in an input language of a Boolean satisfiability solver. As an example, the parameter s may be provided as $\langle S_0, \ldots, S_{M-1}\rangle$, where $S_j$: $\{0, 1\}^V$ may be a variable for some bit lane j. Thus, a solution found by the Boolean satisfiability solver may include a parameter $S_j$ for the bit lane j.

The inventor has recognized and appreciated that, given an allowed input pattern P (which is in $Labels'^M$, defined similarly as $Labels'^M$), Eval(P) may be 1 by construction of Eval. The corresponding constraint may provide that (Ind (Enc(P))=S)=Eval(P)=1. As a result, Ind(Enc(P)) may match S, and a policy check function parameterized by Ind and S may map Enc(P) to 1. Hence, the policy check function may have no false positive error.

Conversely, given a disallowed input pattern P in $Labels'^M$, Eval(P) may be 0 by construction of Eval. The corresponding constraint may provide that (Ind(Enc(P))=S)=Eval(P)=0. As a result, Ind(Enc(P)) may not match S, and a policy check function parameterized by Ind and S may map Enc(P) to 0. Hence, the policy check function may have no false negative error in $Labels'^M$.

Although the inventor has recognized and appreciated various advantages of using an evaluation function, aspects of the present disclosure are not so limited. In some embodiments, a constraint for an allowed input pattern P may simply provide that Ind(Enc(P))=S, as described above.

Figure 9:
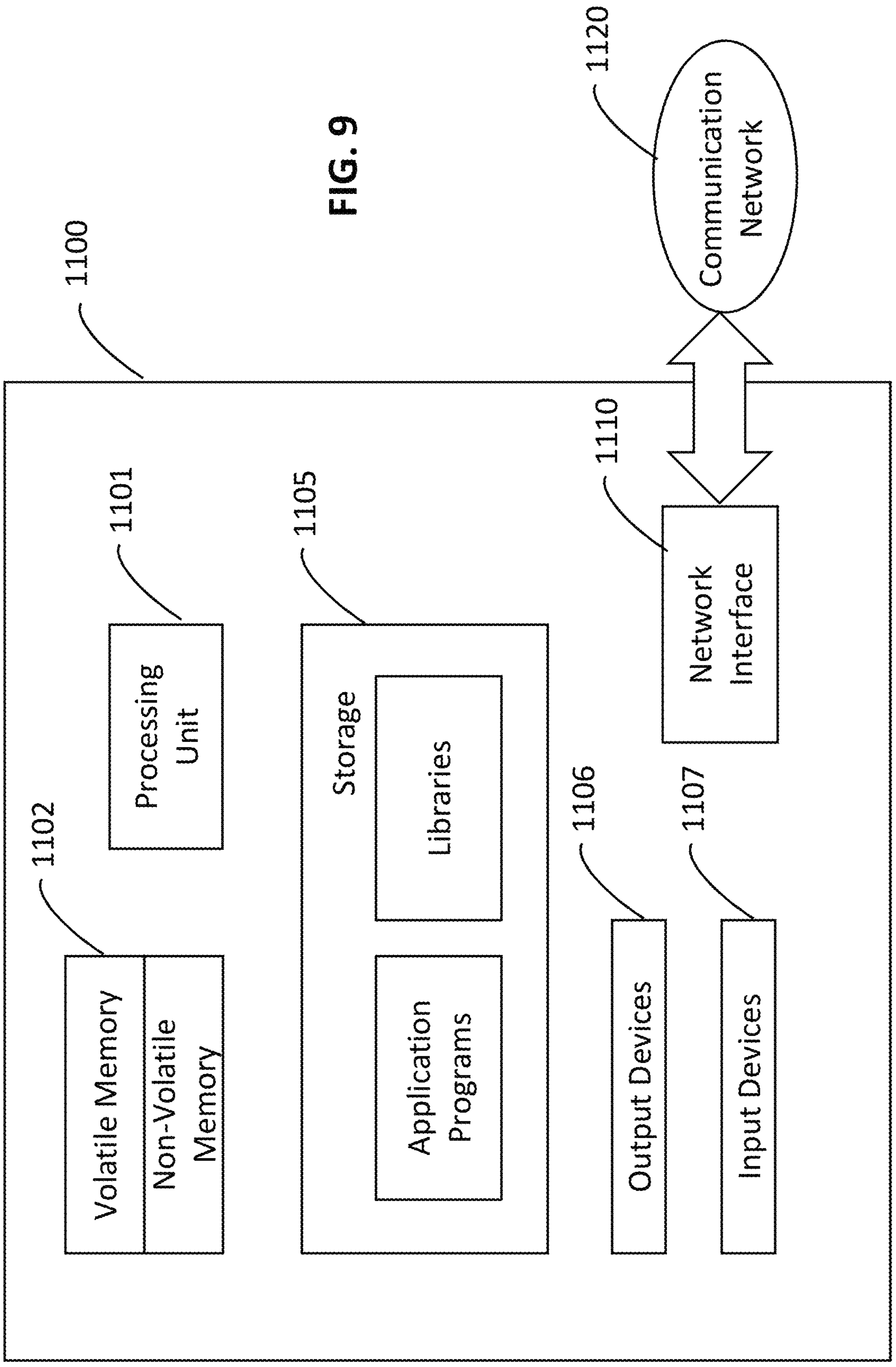
FIG. 9 shows, schematically, an illustrative computer 1100 on which aspects of the present disclosure may be implemented.

FIG. 9 shows, schematically, an illustrative computer 1100 on which any aspect of the present disclosure may be implemented. In the example of FIG. 9, the computer 1100 includes a processing unit 1101 having one or more processors and a computer-readable storage medium 1102 that may include, for example, volatile and/or non-volatile memory. The memory 1102 may store one or more instructions to program the processing unit 1101 to perform any of the functions described herein. The computer 1100 may also include other types of computer-readable medium, such as storage 1105 (e.g., one or more disk drives) in addition to the system memory 1102. The storage 1105 may store one or more application programs and/or resources used by application programs (e.g., software libraries), which may be loaded into the memory 1102.

The computer 1100 may have one or more input devices and/or output devices, such as output devices 1106 and input devices 1107 illustrated in FIG. 9. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1107 may include a microphone for capturing audio signals, and the output devices 1106 may include a display screen for visually rendering, and/or a speaker for audibly rendering, recognized text.

In the example of FIG. 9, the computer 1100 may also include one or more network interfaces (e.g., network interface 1110) to enable communication via various networks (e.g., communication network 1120). Examples of networks include local area networks (e.g., an enterprise network), wide area networks (e.g., the Internet), etc. Such networks may be based on any suitable technology, and may operate according to any suitable protocol. For instance, such networks may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer, or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple non-transitory computer-readable media) (e.g., a computer memory, one or more floppy discs, compact discs, optical discs, magnetic tapes, flash memories, circuit configurations in field-programmable gate arrays or other semiconductor devices, or other tangible computer-readable media) encoded with one or more programs that, when executed on one or more processors, perform methods that implement the various embodiments of the present disclosure described above. The computer-readable medium or media may be transportable, such that the program or programs stored thereon may be loaded onto one or more different computers or other processors to implement various aspects of the present disclosure as described above.

The terms "program" or "software" are used herein to refer to any type of computer code or set of computer-executable instructions that may be employed to program one or more processors to implement various aspects of the present disclosure as described above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that how the data elements are related.

Various features and aspects of the present disclosure may be used alone, in any combination of two or more, or in a variety of arrangements not specifically discussed in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

As used herein, the term "and/or" is intended to mean "one or both." For example, "A and/or B" encompasses A alone, B alone, and both A and B together. Similarly, "A, B, and/or C" encompasses any combination of the referenced elements: A alone, B alone, C alone, A and B together, A and C together, B and C together, or A, B, and C together. This terminology is meant to be inclusive of all combinations of the listed elements, ensuring that the disclosure is interpreted broadly and without limitation to any specific arrangement unless explicitly stated otherwise.

Also, the phraseology and terminology used herein is for the purpose of description and should not be regarded as limiting. The use of "including," "comprising," "having," "containing," "involving," "based on," "according to," "encoding," and variations thereof herein, is meant to encompass the items listed thereafter and equivalents thereof as well as additional items.

What is claimed is:

1. A system comprising:

processing hardware configured to:

receive an input metadata pattern associated with an instruction executed by a host processor, the input metadata pattern comprising:

one or more first input metadata labels associated with the instruction and/or a state of the host processor, wherein the one or more first input metadata labels are determined based on information that is available before the instruction is decoded by the host processor; and one or more second input metadata labels associated, respectively, with one or more registers used by the instruction and/or one or more memory locations referenced by the instruction; and generate an output metadata pattern, wherein:

the one or more first input metadata labels are used to determine how to process the one or more second input metadata labels to generate the output metadata pattern.

2. The system of claim 1, wherein;

the processing hardware is configured to use the one or more first input metadata labels to look up a transformation to be applied to a bit string obtained from the one or more second input metadata labels.

3. The system of claim 2, wherein the transformation comprises a mask.

4. The system of claim 1, wherein:

the one or more first input metadata labels are associated, respectively, with one or more first input slots of the input metadata pattern; and the one or more second input metadata labels are associated, respectively, with one or more second input slots of the input metadata pattern.

5. The system of claim 4, wherein: the processing hardware is configured to use the one or more first input metadata labels to selectively disable at least one second input slot of the one or more second input slots.

6. The system of claim 1, wherein: the processing hardware is configured to use the one or more first input metadata labels to selectively activate at least one hardware block of a plurality of hardware blocks configured to process information obtained from the one or more second input metadata labels.

7. The system of claim 1, wherein: the processing hardware is configured to use the one or more first input metadata labels to configure a hardware block for processing information obtained from the one or more second input metadata labels.

8. The system of claim 7, wherein:
the hardware block is configured to apply a selected operation to one or more bit strings obtained from the one or more second input metadata labels; and
the operation is selected, based on the one or more first input metadata labels, from a plurality of operations on bit strings.

9. The system of claim 7, wherein:
the output metadata pattern comprises at least one output metadata label;
the hardware block is configured to generate, based on the information obtained from the one or more second input metadata labels, the at least one output metadata label; and
the processing hardware is further configured to:
use the one or more first input metadata labels to select at least one output slot from a plurality of output slots of the output metadata pattern; and
provide the at least one output metadata label to the at least one selected output slot.

10. The system of claim 1, wherein the processing hardware comprises a policy check function block configured to provide, based on the one or more first input metadata labels and/or the one or more second input metadata labels, an indication of whether the instruction is allowed according to one or more policies.

11. The system of claim 10, wherein
the processing hardware further comprises a conversion block configured to convert the one or more first input metadata labels and/or the one or more second input metadata labels into one or more third input metadata labels; and
the policy check function block is configured to receive, as input, the one or more third input metadata labels.

12. The system of claim 11, wherein the conversion block comprises an expansion block configured to convert bit strings of length N' into bit strings of length N, where N>N'.

13. The system of claim 10, wherein:
the output metadata pattern comprises one or more output metadata labels; and
the processing hardware further comprises an output function block configured to provide, based on the one or more first input metadata labels and/or the one or more second input metadata labels, the one or more output metadata labels to one or more respective output slots of the output metadata pattern.

14. The system of claim 1, wherein: the one or more first input metadata labels are used to determine how to process the one or more first input metadata labels and the one or more second input metadata labels to generate the output metadata pattern.

15. The system of claim 1, wherein the processing hardware comprises one or more programmable logic devices programmed by bitstreams.

16. The system of claim 1, wherein the processing hardware comprises one or more logic circuits fabricated into semiconductors.

17. A method performed by processing hardware, the method comprising acts of:
receiving an input metadata pattern associated with an instruction executed by a host processor, the input metadata pattern comprising:
one or more first input metadata labels associated with the instruction and/or a state of the host processor, wherein the one or more first input metadata labels are determined based on information that is available before the instruction is decoded by the host processor; and
one or more second input metadata labels associated, respectively, with one or more registers used by the instruction and/or one or more memory locations referenced by the instruction; and
generating an output metadata pattern, wherein:
the one or more first input metadata labels are used to determine how to process the one or more second input metadata labels to generate the output metadata pattern.

18. At least one non-transitory computer-readable medium having stored thereon at least one hardware description that, when synthesized, produces at least one netlist for one or more logic circuits to be fabricated into semiconductors and/or bitstreams for programming one or more programmable logic devices, wherein the one or more logic circuits and/or the one or more programmed logic devices are configured to:
receive an input metadata pattern associated with an instruction executed by a host processor, the input metadata pattern comprising:
one or more first input metadata labels associated with the instruction and/or a state of the host processor, wherein the one or more first input metadata labels are determined based on information that is available before the instruction is decoded by the host processor; and
one or more second input metadata labels associated, respectively, with one or more registers used by the instruction and/or one or more memory locations referenced by the instruction; and
generate an output metadata pattern, wherein:
the one or more first input metadata labels are used to determine how to process the one or more second input metadata labels to generate the output metadata pattern.

19. The method of claim 17 further comprising:
using the one or more first input metadata labels to look up a transformation to be applied to a bit string obtained from the one or more second input metadata labels.

20. The method of claim 19, wherein the transformation comprises a mask.

21. The method of claim 17, wherein:
the one or more first input metadata labels are associated, respectively, with one or more first input slots of the input metadata pattern; and
the one or more second input metadata labels are associated, respectively, with one or more second input slots of the input metadata pattern.

22. The method of claim 21 further comprising:

using the one or more first input metadata labels to selectively disable at least one second input slot of the one or more second input slots.

23. The method of claim 17 further comprising:

using the one or more first input metadata labels to selectively activate at least one hardware block of a plurality of hardware blocks configured to process information obtained from the one or more second input metadata labels.

24. The method of claim 17 further comprising:

using the one or more first input metadata labels to configure a hardware block for processing information obtained from the one or more second input metadata labels.

25. The method of claim 24, wherein:

the hardware block applies a selected operation to one or more bit strings obtained from the one or more second input metadata labels, and the operation is selected, based on the one or more first input metadata labels, from a plurality of operations on bit strings.

26. The method of claim 24, wherein:

the output metadata pattern comprises at least one output metadata label;

the hardware block generates, based on the information obtained from the one or more second input metadata labels, the at least one output metadata label; and the method further comprises:

using the one or more first input metadata labels to select at least one output slot from a plurality of output slots of the output metadata pattern; and providing the at least one output metadata label to the at least one selected output slot.

27. The method of claim 17 further comprising:

providing, by a policy check function block of the processing hardware, based on the one or more first input metadata labels and/or the one or more second input metadata labels, an indication of whether the instruction is allowed according to one or more policies.

28. The method of claim 27 further comprising:

converting, by a conversion block of the processing hardware, the one or more first input metadata labels and/or the one or more second input metadata labels into one or more third input metadata labels; and receiving, by the policy check function block, as input, the one or more third input metadata labels.

29. The method of claim 28, wherein the conversion block comprises an expansion block that converts bit strings of length N' into bit strings of length N, where N>N'.

30. The method of claim 27, wherein the output metadata pattern comprises one or more output metadata labels, and the method further comprises:

providing, by an output function block of the processing hardware, based on the one or more first input metadata labels and/or the one or more second input metadata labels, the one or more output metadata labels to one or more respective output slots of the output metadata pattern.

31. The method of claim 17, wherein:

the one or more first input metadata labels are used to determine how to process the one or more first input metadata labels and the one or more second input metadata labels to generate the output metadata pattern.

* * * * *